US012474302B1

(12) United States Patent
Davis et al.

(10) Patent No.: US 12,474,302 B1
(45) Date of Patent: Nov. 18, 2025

(54) FERMENTATION PRODUCT MONITORING SYSTEMS AND ASSOCIATED METHODS

(71) Applicant: Triad National Security, LLC, Los Alamos, NM (US)

(72) Inventors: Eric Sean Davis, Los Alamos, NM (US); Cristian Pantea, Los Alamos, NM (US); Vamshi Krishna Chillara, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 310 days.

(21) Appl. No.: 18/296,341

(22) Filed: Apr. 5, 2023

Related U.S. Application Data

(60) Provisional application No. 63/328,079, filed on Apr. 6, 2022.

(51) Int. Cl.
*G01N 29/032* (2006.01)
*G01N 29/44* (2006.01)

(52) U.S. Cl.
CPC ....... *G01N 29/032* (2013.01); *G01N 29/4427* (2013.01); *G01N 2291/011* (2013.01); *G01N 2291/015* (2013.01); *G01N 2291/02809* (2013.01); *G01N 2291/02836* (2013.01); *G01N 2291/048* (2013.01)

(58) Field of Classification Search
CPC ............. G01N 29/032; G01N 29/4427; G01N 2291/011; G01N 2291/015; G01N 2291/02809; G01N 2291/02836; G01N 2291/048
USPC .......................................................... 73/599
See application file for complete search history.

(56) References Cited

U.S. PATENT DOCUMENTS

| | | |
|---|---|---|
| 6,467,350 B1 | 10/2002 | Kaduchuk et al. |
| 6,644,118 B2 | 11/2003 | Kaduchuk et al. |
| 6,644,119 B1 | 11/2003 | Sinha |
| 6,889,560 B2 | 5/2005 | Sinha |
| 6,959,601 B2 | 11/2005 | Sinha |
| 7,228,740 B2 | 6/2007 | Sinha |
| 7,963,165 B2 | 6/2011 | Sinha |
| 8,166,801 B2 | 5/2012 | Sinha |
| 8,176,783 B2 | 5/2012 | Sinha |
| 8,640,529 B2 | 2/2014 | Sinha |

(Continued)

*Primary Examiner* — Peter J Macchiarolo
*Assistant Examiner* — John M Royston
(74) *Attorney, Agent, or Firm* — Klarquist Sparkman, LLP

(57) ABSTRACT

Fermentation product monitoring systems and associated methods. A fermentation product monitoring system comprises an ultrasonic transmitter configured to transmit a transmitted ultrasonic signal through a fluid; an ultrasonic receiver configured to receive a received ultrasonic signal; an automated valve configured to regulate a flow of the fluid; and a signal generation and analysis assembly configured to actuate the automated valve responsive to detecting a transition from a first fluid comprising a slurry to a second fluid comprising a non-slurry. A method of using a fermentation product monitoring system comprises transmitting a transmitted ultrasonic signal through a fluid; receiving a received ultrasonic signal; processing a received electrical signal; and actuating an automated valve to regulate a flow of the fluid responsive to a detecting that the fluid within the primary ultrasonic signal path has transitioned from a first fluid comprising a slurry to a second fluid comprising a non-slurry.

19 Claims, 6 Drawing Sheets

(56) References Cited

U.S. PATENT DOCUMENTS

| | | |
|---|---|---|
| 8,820,147 B2 | 9/2014 | Sinha |
| 9,234,779 B2 | 1/2016 | Sinha |
| 9,354,094 B2 | 5/2016 | Sinha |
| 9,404,890 B2 | 8/2016 | Sinha et al. |
| 10,088,590 B2 | 10/2018 | Sinha et al. |
| 2009/0158822 A1* | 6/2009 | Sun .................... G01N 29/222 73/1.83 |
| 2019/0277706 A1* | 9/2019 | Green ................ F27D 21/0014 |
| 2021/0096109 A1 | 4/2021 | Sinha et al. |

* cited by examiner

FERMENTATION PRODUCT MONITORING SYSTEMS AND ASSOCIATED METHODS

CROSS REFERENCE TO RELATED APPLICATION

This application claims the benefit of U.S. Provisional Application Ser. No. 63/328,079, entitled FERMENTATION PRODUCT MONITORING SYSTEMS AND ASSOCIATED METHODS, filed on Apr. 6, 2022, which is incorporated by reference herein.

ACKNOWLEDGMENT OF GOVERNMENT SUPPORT

This invention was made with government support under 89233218CNA000001 awarded by the U.S. Department of Energy. The government has certain rights in the invention.

FIELD

The present disclosure is directed to fermentation product monitoring systems and associated methods, and particularly to systems and methods that use ultrasonic transducers to perform non-contact measurements.

BACKGROUND

In the production of various potable liquids produced with a fermentation process, such as beer, wine, and certain liquors, the fermentation process may present certain technical challenges. For example, as fermentation progresses during beer-making, waste products from the fermentation are produced in the fermentation tank, including spent yeast, lees (sediment including heavy fats, coagulated proteins, and inactive yeast), and possibly some trub (leftover material after producing the wort). Conical fermentation tanks are an integral part of a modern brewery, largely due to the capability they provide to breweries to collect and dump the yeast slurry at the end of a fermentation cycle. Specifically, at the end of the fermentation cycle, this waste slurry is dumped out of the bottom of the conical fermentation tank, whose shape is specifically designed to collect these solids on the bottom. This waste is either discarded (such as in smaller breweries), or in certain cases, is recovered to extract any live yeast for reuse. This slurry removal process typically is done by hand and can take anywhere from 30 seconds to 30 minutes. When the flow of the liquid being removed transitions from the yeast slurry to the fermented beer above the yeast slurry, the flow rate quickly become sufficiently high to cause massive product loss if the flow is not stopped immediately, such as with a valve. Due to the variable time required for this process, and the quick reaction time needed to close the valve after transition, the use of manual labor causes hundreds to thousands of gallons of beer loss per tank every year.

The typical approaches to addressing this problem largely depend on the scale of the brewery. In the vast majority of small- to medium-size breweries (e.g., "nanobreweries" or "microbreweries"), this process is done manually. In practice, an employee will position a tray or bucket underneath the tank (unless yeast recovery is being attempted) and open up a valve (e.g., a butterfly valve), allowing for the slurry to flow. The slurry will flow very slowly, and once the slurry is no longer blocking the pipe, the beer will start flowing and the employee will close the valve. A manual approach is problematic because the transition from yeast slurry to beer can happen very quickly, and once it happens, the beer flows out at a rate of multiple gallons per second. Not only does this process take up valuable labor time, but it also can lead to catastrophic product loss if the employee is not intensely focusing on the task, which may be nearly impossible when the process takes up to 30 minutes. Even the quickest human reaction will cause product loss due to the beer flow rate. This product loss, even in the best-case scenario, will add up to a significant amount over the course of a year.

Larger "macrobreweries" have addressed the issue with a "brute force" approach that relies upon continually flowing the slurry through a loop with peristaltic pumps while performing optical turbidity measurements of the slurry. This is an extremely expensive and technology-intensive solution that still yields several practical issues, such as the need to calibrate for separate beer types, as well as maintenance requirements. Peristaltic pumps also are maintenance intensive and will wear out over time.

Another problem relates to fermentation analysis. For example, several methods exist for estimating and/or determining when a fermentation process has concluded, with corresponding benefits and shortcomings. Fermentation is one of the lengthiest steps in beer production, and also represents the process step that suffers from the most inefficiency and product loss. Historically, technological solutions for this process step have been lacking. As fermentation has one of the largest impacts on eventual product quality, consistency can be important. It is expected that an automated and/or robust method of determining fermentation progress may yield approximately 10% fermentation cost savings as well as 25% increased turnaround on batches. These cost savings come from less reliance on manual labor for measurements, as well as less time required for pumps/temperature control. Because the fermentation process typically requires more than a week to complete, any small percentage improvement on fermentation progress measurements will represent a huge time savings in pushing the batch to the next process step.

Typically, fermentation progress is monitored through manual specific gravity measurements. In such a method, a brewery worker takes a direct sample from the tank, places it into a graduated cylinder, and uses a hydrometer to measure the specific gravity of the beer as it ferments. This may be repeated every several hours, and after a certain number of successive specific gravity measurements are the same, the fermentation is determined to be complete. Such specific gravity measurements generally require removal of a large volume of liquid from the fermentation tank.

Very recently, other technologies have come to market addressing this issue and providing some automation. Not all technologies measure quantities that are directly equivalent to specific gravity. These devices measure qualities such as color, sugar content, cell count, turbidity, pH, and other metrics. Some such devices measure specific gravity in-situ, such as via a tuning fork method and/or a pulse-echo acoustic approach. All of these methods, however, are invasive and require contact with the fermenting beer.

SUMMARY

Disclosed herein are examples of monitoring systems for fermentation products (e.g., fermenting liquids, fermented liquids, and/or fermentation byproducts), as well as related methods for the use of such system.

In one representative example, a fermentation product monitoring system comprises an ultrasonic transmitter configured to be operatively coupled to a fluid conduit containing a volume of a fluid and to transmit a transmitted ultrasonic signal through the fluid at least partially along a primary ultrasonic signal path; an ultrasonic receiver configured to be operatively coupled to the fluid conduit and to receive a received ultrasonic signal that is based, at least in part, on the transmitted ultrasonic signal; an automated valve configured to regulate a flow of the fluid through the fluid conduit; and a signal generation and analysis assembly configured to generate and transmit a transmitted electrical signal to the ultrasonic transmitter and to receive a received electrical signal from the ultrasonic receiver. The signal generation and analysis assembly is configured to generate and transmit a valve actuation signal to actuate the automated valve to a closed position based, at least in part, on the received electrical signal representing a transition of the fluid from a first fluid that comprises a slurry to a second fluid that comprises a non-slurry.

In some examples, the fluid conduit fluidly interconnects the automated valve and a fermentation vessel; the first fluid comprises a yeast slurry, the second fluid comprises a fermented liquid, and the fermentation product monitoring system is configured to actuate the automated valve to regulate a flow of the fluid from the fermentation vessel through the fluid conduit and out of a fluid outlet downstream of the automated valve to cease the flow through the fluid conduit when the fluid within the primary ultrasonic signal path transitions from the yeast slurry to the fermented liquid.

In some examples, the signal generation and analysis assembly is configured to measure an amplitude of the received electrical signal at a rate of 10-50 times per second, and the signal generation and analysis assembly is configured to generate and transmit the valve actuation signal based, at least in part, on the amplitude of the received electrical signal.

In some examples, the received ultrasonic signal represents an attenuated version of the transmitted ultrasonic signal, the signal generation and analysis assembly is configured to determine an acoustic transmissivity of the fluid based, at least in part, on the received electrical signal, and the signal generation and analysis assembly is configured to generate the valve actuation signal responsive to the acoustic transmissivity exceeding a threshold transmissivity.

In some examples, the signal generation and analysis assembly comprises an electrical signal generator configured to generate the transmitted electrical signal; a signal digitizer configured to receive an analog electrical signal that is based, at least in part, on the received electrical signal and to digitize the analog electrical signal into a digitized electrical signal; a signal analysis controller configured to receive an input electrical signal that is based, at least in part, on the digitized electrical signal and to calculate one or more fluid properties of the fluid based, at least in part, on the input electrical signal; and an automated valve controller that comprises a direct current (DC) power supply configured to generate and transmit the valve actuation signal to the automated valve.

In some examples, the fermentation product monitoring system is configured such that no portion of the fermentation product monitoring system comes into direct contact with the fluid during operative use of the fermentation product monitoring system, and each of the ultrasonic transmitter and the ultrasonic receiver is configured to be operatively coupled to a surface of the fluid conduit.

In some examples, one or both of the ultrasonic transmitter and the ultrasonic receiver comprises an ultrasonic transducer that is configured to one or both of generate and receive an ultrasonic signal with a frequency that is at least 100 kilohertz (kHz) and at most 5 megahertz (MHz).

In another representative example, a method of using a fermentation product monitoring system comprises transmitting, with an ultrasonic transmitter of the fermentation product monitoring system, a transmitted ultrasonic signal through a fluid within a fluid conduit at least partially along a primary ultrasonic signal path, wherein the fluid conduit fluidly interconnects a fermentation vessel and a fluid outlet via an automated valve of the fermentation product monitoring system; receiving, with an ultrasonic receiver of the fermentation product monitoring system, a received ultrasonic signal that is based, at least in part, on the transmitted ultrasonic signal; processing, with a signal generation and analysis assembly of the fermentation product monitoring system, a received electrical signal that is based, at least in part, on the received ultrasonic signal; and actuating, with the signal generation and analysis assembly, the automated valve from an open state to a closed state to regulate a flow of fluid from the fermentation vessel through the fluid conduit and out of the fluid outlet. The actuating the automated valve comprises generating, with the signal generation and analysis assembly, a valve actuation signal and transmitting the valve actuation signal to the automated valve. The generating the valve actuation signal is performed responsive to a change in the received electrical signal representing that the fluid within the primary ultrasonic signal path has transitioned from a first fluid that comprises a slurry to a second fluid that comprises a non-slurry.

In some examples, the first fluid comprises a yeast slurry, the second fluid comprises a fermented liquid, and the generating the valve actuation signal is performed to cease the flow through the fluid conduit when the fluid within the primary ultrasonic signal path transitions from the yeast slurry to the fermented liquid.

In some examples, the receiving the received ultrasonic signal comprises receiving an attenuated version of the transmitted ultrasonic signal, the processing the received electrical signal comprises determining an acoustic transmissivity of the fluid based, at least in part, on a ratio of a received amplitude of the received ultrasonic signal to a transmitted amplitude of the transmitted ultrasonic signal, and the generating the valve actuation signal is performed responsive to the acoustic transmissivity exceeding a threshold transmissivity.

In some examples, the transmitting the transmitted ultrasonic signal comprises transmitting one or more of a Gaussian waveform, a sinusoidal modulated Gaussian waveform, and a Gabor waveform.

In some examples, the signal generation and analysis assembly comprises a signal analysis controller. The processing the received electrical signal comprises receiving, with the signal analysis controller, an input electrical signal that is based, at least in part, on the received electrical signal; and calculating, with the signal analysis controller and based at least in part on the input electrical signal, one or more fluid properties of the fluid. The calculating the one or more fluid properties comprises preprocessing, with the signal analysis controller, a modified signal that is based, at least in part, on the input electrical signal. The preprocessing the modified signal comprises subtracting a mean value from one or both of the input electrical signal and the modified signal and gating one or both of the input electrical signal and the modified signal based on an expected time of flight of the transmitted ultrasonic signal through the fluid to isolate a portion of one or both of the input electrical signal and the modified signal that corresponds to a portion of the received ultrasonic signal that represents propagation of the transmitted ultrasonic signal along the primary ultrasonic signal path.

In some examples, the method is performed while every portion of the fermentation product monitoring system is fluidly isolated from the fluid.

In some examples, the method further comprises, prior to the transmitting the transmitted ultrasonic signal, operatively coupling each of the ultrasonic transmitter and the ultrasonic receiver to an external surface of the fluid conduit.

In another representative example, a fermentation product monitoring system comprises an ultrasonic transmitter configured to be operatively coupled to a vessel containing a volume of a fluid and to transmit a transmitted ultrasonic signal through the fluid at least partially along a primary ultrasonic signal path; an ultrasonic receiver configured to be operatively coupled to the vessel and to receive a received ultrasonic signal that is based, at least in part, on the transmitted ultrasonic signal; and a signal generation and analysis assembly configured to generate and transmit a transmitted electrical signal to the ultrasonic transmitter and to receive a received electrical signal from the ultrasonic receiver. The signal generation and analysis assembly is configured to determine one or more fluid properties of the fluid based, at least in part, on the received electrical signal.

In some examples, the fermentation product monitoring system is configured such that the ultrasonic transmitter and the ultrasonic receiver are operatively coupled to a surface of the vessel on opposing sides of the vessel during operative use of the fermentation product monitoring system.

In some examples, the signal generation and analysis assembly is configured to generate a fluid monitoring report that represents the one or more fluid properties, and the fluid monitoring report comprises an indication of one or more of a density of the fluid, an indication of a specific gravity of the fluid, an indication of a rate of change of one or more fluid properties of the fluid, an indication that a fermentation process has concluded, an estimate as to when the fermentation process will conclude, and a confidence interval associated with any other indication provided in the fluid monitoring report.

In some examples, the transmitted ultrasonic signal comprises one or more of a Gaussian waveform, a sinusoidal modulated Gaussian waveform, and a Gabor waveform, and the signal generation and analysis assembly is configured to analyze the received electrical signal via a Gaussian reconstruction scheme to determine the one or more fluid properties.

In some examples, the signal generation and analysis assembly comprises one or more of a user input device configured to receive an input from a human user to direct operation of the fermentation product monitoring system; a display device configured to provide a visual representation of a fluid monitoring report that represents the one or more fluid properties; a data recording device configured to record at least a portion of the fluid monitoring report onto a non-transitory storage medium; and a data transfer device configured to convey at least a portion of the fluid monitoring report to an external device.

In some examples, every portion of the fermentation product monitoring system is fluidly isolated from the fluid.

The foregoing and other objects, features, and advantages of the disclosed technology will become more apparent from the following detailed description, which proceeds with reference to the accompanying figures.

DETAILED DESCRIPTION

Figure 1:
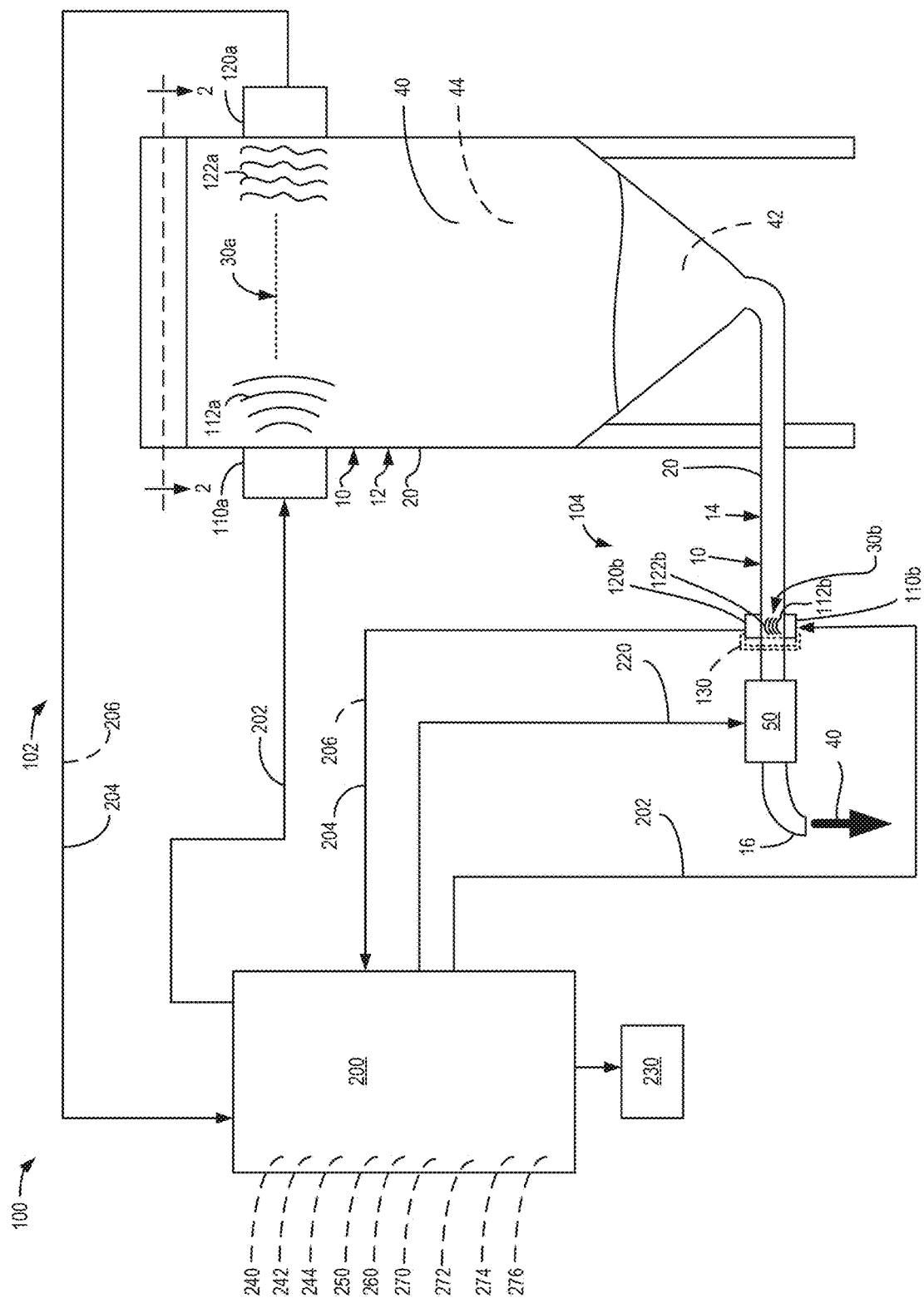
FIG. 1 is a schematic representation of examples of fluid monitoring systems used in conjunction with vessels in the form of fluid storage vessels and/or fluid conduits.
Figure 2:
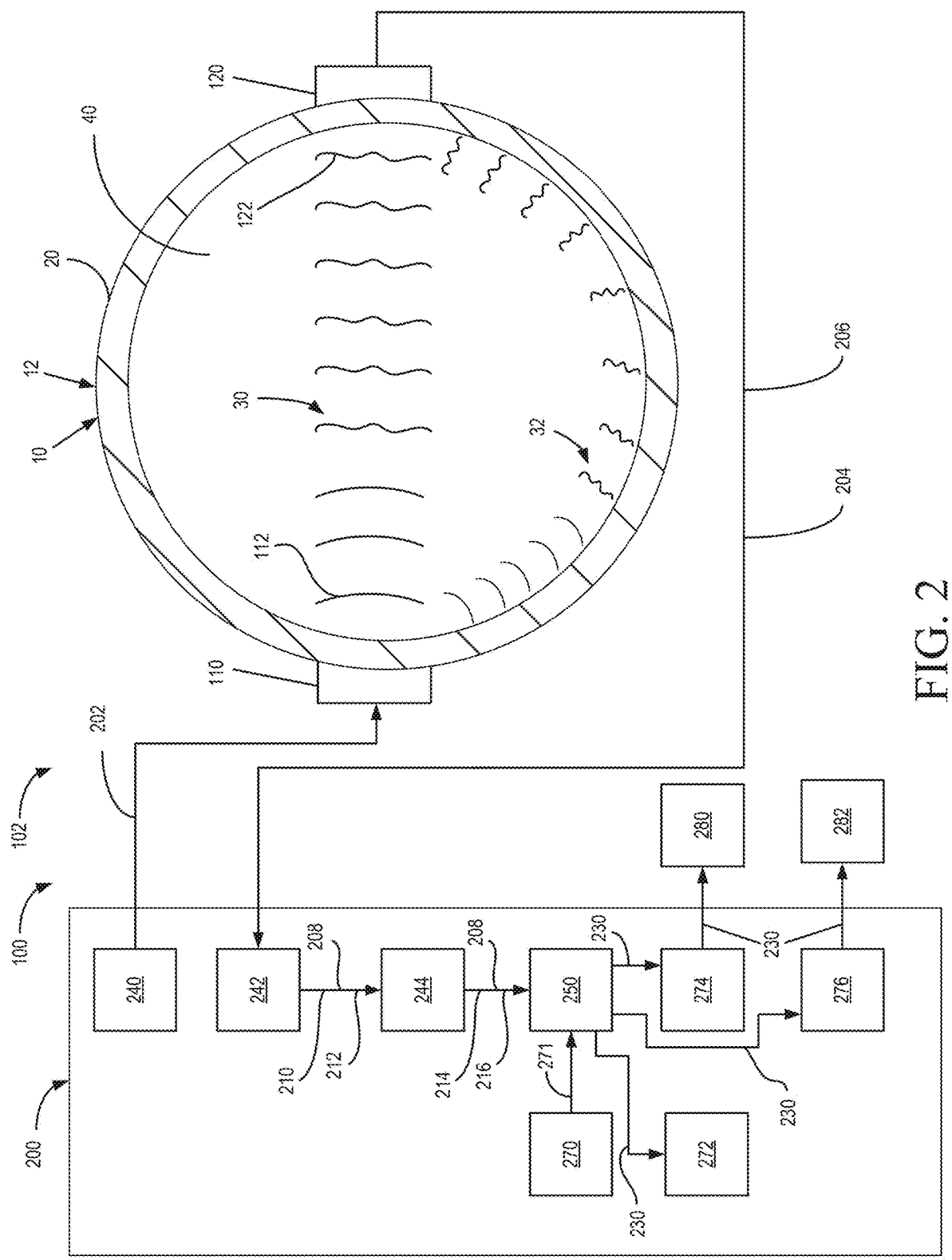
FIG. 2 is a schematic representation of an example fluid monitoring system in the form of a fluid characterization system used in conjunction with a fluid storage vessel as viewed along the line 2-2 in FIG. 1.
Figure 3:
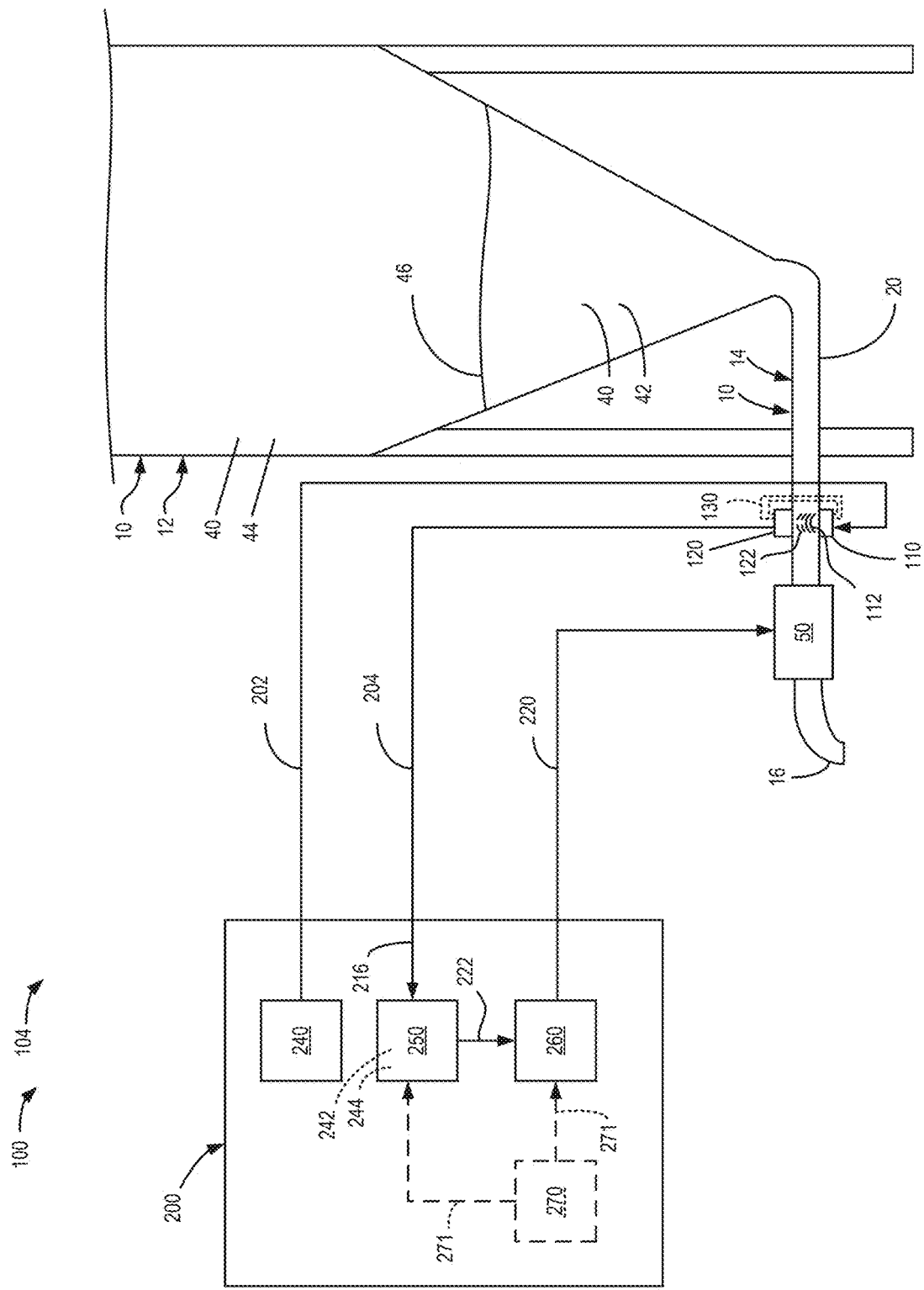
FIG. 3 is a schematic representation of an example fluid monitoring system in the form of an automated fluid flow control system used in conjunction with a fluid conduit.

Examples of the disclosed technology include systems and methods for performing non-contact measurements of one or more properties of a fluid contained within and/or flowing through a vessel. FIGS. 1-3 show a fluid monitoring system 100, which may include and/or be a fluid characterization system 102 and/or an automated fluid flow control system 104. Stated differently, and as described in more detail herein, the fluid characterization systems 102 and the automated fluid flow control systems 104 disclosed herein each represent examples of the fluid monitoring system 100. Accordingly, various components, features, configurations, attributes, etc. that are disclosed herein with reference to the fluid monitoring system 100 also may be understood as pertaining to either or both of the fluid characterization system 102 and/or the automated fluid flow control system 104, as applicable. Similarly, it is to be understood that any components, features, configurations, attributes, etc. that are disclosed with reference to one of the fluid characterization system 102 or the automated fluid flow control system 104 also may be understood as pertaining to the other of the fluid characterization system 102 and the automated fluid flow control system 104, as applicable.

As described in more detail below, FIG. 1 schematically illustrates examples of the fluid monitoring system 100 including examples of the fluid characterization system 102 and of the automated fluid flow control system 104. FIG. 2 schematically illustrates examples of the fluid characterization system 102 (with specific components shown as viewed along the line 2-2 in FIG. 1), while FIG. 3 schematically illustrates examples of the automated fluid flow control system 104.

As described in more detail below, the fluid monitoring system 100, the fluid characterization system 102, and/or the automated fluid flow control system 104 may be configured to measure and/or monitor any of a variety of properties of a fluid (e.g., a liquid or a slurry) under consideration. Such systems may find particular utility in applications where the fluid is a fermented potable liquid such as beer, wine, or liquid, and/or a precursor or byproduct of an associated fermentation process. As a more specific example, and as described in more detail herein, the fluid characterization system 102 may be used to monitor the progress of a fermentation process, such as to determine when the fermentation process has concluded. As another example, and as described in more detail below, the automated fluid flow control system 104 may be used to automate the operation of a valve to regulate the flow of a fermentation waste product from a fermentation vessel with minimal loss of the fermented liquid.

The present disclosure generally may be described as relating to examples in which the data collected and/or generated by the fluid monitoring system 100 is used to trigger production actions. For example, the fluid monitoring system 100 and/or the fluid characterization system 102 indicating that a fermentation process of a beer has concluded may satisfy a condition for proceeding to further beer production steps such as conditioning and/or carbonation. As another example, and as described in more detail below, the fluid monitoring system 100 and/or the automated fluid flow control system 104 indicating a transition of a fluid within a fluid conduit from a waste product to a commercial product may trigger the actuation of a valve to preserve the commercial product. It is to be understood, however, that these are non-limiting examples, and that fluid monitoring systems 100 according to the present disclosure may generate data that may be used to trigger any of a variety of actions, such as production actions.

The present disclosure generally relates to examples in which the fluid monitoring system 100, the fluid characterization system 102, and/or the automated fluid flow control system 104 is utilized in conjunction with fluids in the form of fermentation products. Accordingly, as used herein, any of the fluid monitoring system 100, the fluid characterization system 102, and/or the automated fluid flow control system 104 additionally or alternatively may be referred to as a fermentation product monitoring system.

As used herein, the term "fermentation product" may be used to refer to any of a variety of fluids and/or substances that are associated with a fermentation process. For example, the fermentation product may include and/or be a fermented liquid (e.g., beer, wine, etc.) and/or a liquid to be fermented (e.g., wort, fruit juice, and/or another liquid including fermentable sugars). Additionally, or alternatively, the fermentation product may include and/or be a byproduct of a fermentation and/or brewing process, such as a slurry and/or a semiliquid mixture including inactive/spent yeast, lees, trub, fats, proteins, etc.

While the present disclosure generally relates to examples in which the fluid monitored by the fluid monitoring system 100 is a fermented liquid and/or a fermentation byproduct, this is not required of all examples and/or applications of the fluid monitoring system 100. For example, it also is within the scope of the present disclosure that the fluid monitoring system 100, the fluid characterization system 102, and/or the automated fluid flow control system 104 may be used with any of a variety of fluids, including non-liquid fluids.

As schematically illustrated in FIGS. 1-3, a fluid monitoring system 100 comprises an ultrasonic transmitter 110, an ultrasonic receiver 120, and a signal generation and analysis assembly 200. The ultrasonic transmitter 110 and the ultrasonic receiver 120 each are configured to be operatively coupled to a vessel 10 containing a volume of a fluid 40. The ultrasonic transmitter 110 is configured to transmit a transmitted ultrasonic signal 112 through the fluid 40 at least partially along a primary ultrasonic signal path 30. The ultrasonic receiver 120 is configured to receive a received ultrasonic signal 122 that is based, at least in part, on the transmitted ultrasonic signal 112. Specifically, the received ultrasonic signal 122 may include and/or be a portion of the transmitted ultrasonic signal 112 that traverses a portion of the volume of the fluid 40 that extends between the ultrasonic transmitter 110 and the ultrasonic receiver 120 (e.g., along the primary ultrasonic signal path 30).

As schematically illustrated in FIGS. 1-3, the signal generation and analysis assembly 200 is configured to generate and transmit a transmitted electrical signal 202 to the ultrasonic transmitter 110 and to receive a received electrical signal 204 from the ultrasonic receiver 120. As described in more detail herein, the received electrical signal 204 is at least partially based on the received ultrasonic signal 122, such that the received electrical signal 204 represents an effect of the fluid 40 upon the transmitted ultrasonic signal 112.

As described in more detail herein, the signal generation and analysis assembly 200 is configured to determine one or more fluid properties of the fluid 40 at least partially based on the received electrical signal 204. In some examples, and as schematically illustrated in FIGS. 1-3, the signal generation and analysis assembly 200 is configured to generate a fluid monitoring report 230 that represents the detected fluid properties. As more specific examples, and as described in more detail herein, the fluid properties may include a speed of sound in the fluid, a density of the fluid, a specific gravity of the fluid, an acoustic transmissivity of the fluid, an acoustic resistivity of the fluid, an amplitude of a quiescent acoustic signal propagating within the fluid, and/or a frequency of the quiescent acoustic signal. The determination of such properties may in turn enable the determination of the state of a chemical process (e.g., a fermentation process) associated with the fluid 40 and/or the identification of the fluid 40 (e.g., among a plurality of fluids with distinct known fluid properties).

While the present disclosure generally describes the fluid monitoring system 100 and/or the signal generation and analysis assembly 200 as operating to determine one or more fluid properties of the fluid 40, it also is within the scope of the present disclosure that the fluid monitoring system 100 may perform one or more operations without specifically determining (e.g., without specifically calculating, recording, explicitly utilizing, etc.) such fluid properties. For example, and as discussed in more detail below, the automated fluid flow control system 104 may be configured to automatically actuate a valve responsive to a determination that the fluid 40 being probed has transitioned from a slurry to a non-slurry. In such examples, such a determination may be performed based upon a change in the fluid properties of the fluid 40 being probed, which in turn may be represented by a change in one or more properties of the received electrical signal 204. That is, such a determination may be directly based upon the properties of the received electrical signal 204, which in turn is at least partially modified by the fluid properties of the fluid 40 being probed. In such examples, the operation of the automated fluid flow control system 104 (e.g., to actuate the valve) may be described as being based on the fluid properties of the fluid (as represented in the received electrical signal 204) even when the signal generation and analysis assembly 200 does not operate to specifically and/or explicitly determine such fluid properties themselves.

In various examples, and as described in more detail below, the fluid monitoring system 100 is configured to generate the transmitted ultrasonic signal 112 as a waveform that propagates through the fluid 40. The fluid 40 may alter the characteristics of the waveform of the transmitted ultrasonic signal 112 in any of a variety of manners, such as by introducing a time delay in receiving the received ultrasonic signal 122, reducing a signal strength of the received ultrasonic signal 122, absorbing specific frequency components of the transmitted ultrasonic signal 112, etc. Accordingly, by detecting and measuring such alterations of the transmitted ultrasonic signal 112, the fluid monitoring system 100 may operate to probe various properties of the fluid 40.

As described in more detail below, the fluid monitoring system 100 may be configured to generate the transmitted ultrasonic signal 112 in any of a variety of manners, such as to match a predetermined shaped waveform and to exhibit a predetermined frequency range. As examples, the fluid monitoring system 100 may be configured to generate the transmitted ultrasonic signal 112 in the form of a Gaussian waveform, a sinusoidal modulated Gaussian waveform, a Gabor waveform, an inverse Gabor transform waveform, a discrete Gabor transform waveform, a scaled Gabor transform waveform, and/or an S transform waveform. Further examples of waveforms that may be utilized as the transmitted ultrasonic signal 112 are disclosed in U.S. Patent Application Publication No. 2021/0096109, filed on Sep. 28, 2020, which is incorporated by reference herein in its entirety.

In some examples, and as described in more detail below, the fluid monitoring system 100 is configured to condition and/or process the received electrical signal 204 prior to determining the properties of the fluid 40. For example, and as described in more detail below, the received electrical signal 204 may be filtered to isolate frequencies that were generated in the transmitted ultrasonic signal 112, such as by hardware filters and/or signal preamplifiers.

Additionally, and as described in more detail below, the received electrical signal 204 may be subjected to any of a variety of signal processing algorithms, examples of which include digital filtering of the signal using filters such as Butterworth filters, Chebyshev filters, elliptic filters, etc., and/or determining time-of-flight of the transmitted ultrasonic signal 112 using methods such as cross-correlation, de-chirp, Hilbert Transform, Gaussian reconstruction, etc. The choice of the method generally will be dictated by the kind of the signal used for generation of the transmitted ultrasonic signal 112. In some examples, more than one method such method may be used for enhanced accuracy.

Likewise, the frequency-dependent signal absorption characteristics can be determined using any of a variety of methods, examples of which include power spectral density (PSD) analyses, root-mean-square estimates, Hilbert transforms, etc. The above methods may be used separately or in conjunction with one another as appropriate.

The manner in which the transmitted ultrasonic signal 112 is generated and/or the manner in which the received electrical signal 204 is analyzed may depend upon an operational mode of the fluid monitoring system 100. For example, when the fluid monitoring system 100 operates as the automated fluid flow control system 104, and as described in more detail below, the fluid monitoring system 100 may operate to trigger the actuation of a valve at a precise moment in time corresponding to a transition from a first fluid such as a yeast slurry to a second fluid such as a fermented liquid. Accordingly, in such examples, the rate at which the transmitted ultrasonic signal 112 is generated and/or at which the received electrical signal 204 is analyzed may be sufficiently high to actuate the valve sufficiently quickly after detecting such a transition to reduce and/or minimize a volume of the fermented liquid that is discarded. More specifically, in such examples, a rate at which the transmitted ultrasonic signal 112 may be generated and/or a rate at which the received electrical signal 204 is analyzed may be at least five times per second, at least ten times per second, at least 20 times per second, at least 30 times per second, at least 50 times per second, at most 100 times per second, and/or 10-50 times per second. Regardless of whether the fluid monitoring system 100 operates as the fluid characterization system 102 or as the automated fluid flow control system 104, however, any suitable waveform shaping or signal analysis methods and/or rates disclosed herein may be used.

In examples in which the signal generation and analysis assembly 200 operates to generate the fluid monitoring report 230, the fluid monitoring report 230 may be presented and/or embodied in any of a variety of forms, and/or may represent any of a variety of fluid properties. As examples, the fluid monitoring report 230 may include and/or be an electronic file (e.g., a spreadsheet, a text document, an image, etc.), a printed report, an electronically displayed report, a visual signal, an audible alert, etc. As more specific examples, when the fluid characterization system 102 is configured to monitor the progress of a fermentation process associated with the fluid 40, the fluid monitoring report 230 may include and/or be an indication of a density of the fluid 40, an indication of the specific gravity of the fluid 40, an indication of a rate of change of one or more fluid properties of the fluid 40, an indication that the fermentation process has concluded, an estimate as to when the fermentation process will conclude, a confidence interval associated with any other indication provided in the fluid monitoring report 230, etc. In some examples, the fluid monitoring report 230 includes a representation of a change of one or more of the fluid properties over time, such as by representing a plurality of serially-measured values of the one or more fluid properties, by graphically representing the change the change in the fluid properties, etc.

In an example in which the fluid monitoring system 100 includes each of the fluid characterization system 102 and the automated fluid flow control system 104, and as schematically illustrated in FIG. 1, the ultrasonic transmitter 110 and/or the ultrasonic receiver 120 of the fluid characterization system 102 may be referred to as an ultrasonic transmitter 110a and/or an ultrasonic receiver 120a, respectively. Similarly, in such an example, the transmitted ultrasonic signal 112, the received ultrasonic signal 122, and/or the primary ultrasonic signal path 30 associated with the fluid characterization system 102 may be referred to as a transmitted ultrasonic signal 112a, a received ultrasonic signal 122a, and/or a primary ultrasonic signal path 30a, respectively. In such an example, and as schematically illustrated in FIG. 1, the ultrasonic transmitter 110 and/or the ultrasonic receiver 120 of the automated fluid flow control system 104 may be referred to as an ultrasonic transmitter 110b and/or an ultrasonic receiver 120b, respectively. Similarly, in such an example, the transmitted ultrasonic signal 112, the received ultrasonic signal 122, and/or the primary ultrasonic signal path 30 associated with the automated fluid flow control system 104 may be referred to as a transmitted ultrasonic signal 112b, a received ultrasonic signal 122b, and/or a primary ultrasonic signal path 30b, respectively. In the present disclosure, references to any component, region, property, etc. that are presented without the label "a" or "b" may be understood as referring to either or both of the "a" and/or "b" instances of the component, region, property, etc. as applicable.

As discussed above, fluid monitoring systems 100 according to the present disclosure may be used with any of a variety of fluids 40, such as liquids and/or potable liquids. In particular examples, the fluid 40 is a fermented liquid (such as beer or wine) and/or a byproduct of an associated fermentation process.

In some examples, the fluid characterization system 102 is configured to monitor a state of a chemical process (e.g., a fermentation process) taking place in the fluid 40, and/or to monitor a level of progress of the chemical process. In such examples, the fluid characterization system 102 also may be referred to as a fermentation monitoring system 102. As a more specific example, the fluid characterization system 102 may be configured to monitor the state and/or progress of a fermentation process, such as to enable a user to determine when the fermentation process has concluded. As described in more detail herein, such a determination may be made based upon any of a variety of fluid properties that may be measured by the fluid monitoring system 100, such as a density and/or a specific gravity of the fluid 40. Unlike existing fermentation monitoring techniques, which generally rely upon sampling and/or otherwise contacting the liquid undergoing fermentation, the fluid monitoring systems 100 and associated methods disclosed herein enable such monitoring without requiring direct access and/or contact with the fluid 40.

In some examples in which the fluid monitoring system 100 includes and/or is the fluid characterization system 102, and as schematically illustrated in FIGS. 1-2, the vessel 10 may include and/or be a fluid storage vessel 12. Examples of fluid storage vessels 12 that may be used in conjunction with the fluid monitoring system 100 include a fermentation vessel, a carboy, a cylindrical vessel, a cylindroconical vessel, a tank, a vat, a metal vessel, a glass vessel, a wooden vessel, a plastic vessel, and/or a concrete vessel. In particular, FIGS. 1-3 schematically illustrate examples in which the fluid storage vessel 12 is a cylindroconical vessel, which also may be referred to as a conical fermenter. As additional examples, the fluid storage vessel 12 may be a vessel that has a capacity (e.g., an internal volume) that is at least five gallons (19 liters (L)), at least ten gallons (38 L), at least 50 gallons (190 L), at least 100 gallons (380 L), at least 500 gallons (1,900 L), at least 1,000 gallons (3,800 L), and/or at most 5,000 gallons (19,000 L).

Additionally, or alternatively, the vessel 10 and/or the fluid storage vessel 12 containing the fluid 40 monitored by the fluid characterization system 102 may be any suitable subset and/or portion of a vessel with sides that are separated by a controlled, defined, and/or otherwise known distance, such as a pipe extending from the side of a fermentation vessel.

In some examples, the automated fluid flow control system 104 may be described as being configured to automatically regulate a flow of the fluid 40 through the vessel 10. In particular, in some examples in which the fluid monitoring system 100 includes and/or is the automated fluid flow control system 104, and as schematically illustrated in FIGS. 1 and 3, the vessel 10 may include and/or be a fluid conduit 14 configured to support a flow of the fluid 40 therethrough.

In some examples, the fluid conduit 14 may be associated with and/or fluidly coupled to the fluid storage vessel 12. For example, and as schematically illustrated in FIGS. 1 and 3, the fluid conduit 14 may fluidly interconnect the fluid storage vessel 12 and an automated valve 50. Specifically, in such examples, the automated fluid flow control system 104 may be configured to actuate the automated valve 50 to regulate a flow of the fluid from the fluid storage vessel 12 through the fluid conduit 14. In this manner, the automated fluid flow control system 104 may be configured to automatically regulate a flow of the fluid 40 from the fluid storage vessel 12 to and out of a fluid outlet 16 positioned downstream of the automated valve 50. In some such examples, and as schematically illustrated in FIGS. 1 and 3, the signal generation and analysis assembly 200 is configured to generate and transmit a valve actuation signal 220 to actuate the automated valve 50 at least partially based on the received electrical signal 204.

In some examples, such as in the examples of FIGS. 1 and 3, the fluid conduit 14 may be described as fluidly interconnecting the fluid storage vessel 12 and the fluid outlet 16 via the automated valve 50. Additionally, or alternatively, the fluid conduit 14 may be described as fluidly interconnecting the fluid storage vessel 12 and the automated valve 50, and further as fluidly interconnecting the automated valve 50 and the fluid outlet 16. Stated differently, in various examples, the conduits extending upstream and downstream of the automated valve 50 each may be described as portions of the fluid conduit 14.

While FIGS. 1 and 3 illustrate the ultrasonic transmitter 110 and the ultrasonic receiver 120 as being coupled to a portion of the fluid conduit 14 upstream of the automated valve 50, this is not required of all examples of the fluid monitoring system 100. For example, it also is within the scope of the present disclosure that the ultrasonic transmitter 110 and the ultrasonic receiver 120 may be operatively coupled to the fluid conduit 14 at a location downstream of the automated valve 50. In this manner, the ultrasonic transmitter 110 and the ultrasonic receiver 120 still may be described as being operatively coupled to the fluid conduit 14 that fluidly interconnects the fluid storage vessel 12 and the automated valve 50 even when the ultrasonic transmitter 110 and the ultrasonic receiver 120 are not directly coupled to a portion of the fluid conduit 14 that extends between the fluid storage vessel 12 and the automated valve 50.

In some examples, and with continued reference to FIGS. 1 and 3, the automated fluid flow control system 104 may be configured to automatically actuate the automated valve 50 (e.g., from an open state to a closed state) upon detecting that the fluid 40 within the fluid conduit 14 has transitioned from a first fluid 42 to a second fluid 44. Specifically, in such examples, the signal generation and analysis assembly 200 may be configured to generate the valve actuation signal 220 responsive to a measured change in the fluid properties of the fluid 40 within the fluid conduit 14 corresponding to the fluid 40 within the primary ultrasonic signal path 30 transitioning from the first fluid 42 to the second fluid 44. In particular, in such examples, the signal generation and analysis assembly 200 may be configured to generate the valve actuation signal 220 responsive to a change in one or more properties of the received electrical signal 204 (e.g., an amplitude of the received electrical signal 204) representing a transition of the fluid 40 within the primary ultrasonic signal path 30 from the first fluid 42 to the second fluid 44.

In some examples, the first fluid 42 is a fermentation byproduct (e.g., a yeast slurry) and the second fluid 44 is a fermented liquid (e.g., beer). In some such examples, the first fluid 42 may be significantly more dense than the second fluid 44, and thus may settle to the bottom of the fluid storage vessel 12, forming a well-defined fluid transition 46 between the first fluid 42 and the second fluid 44. When the fermentation of the second fluid 44 is complete, the first fluid 42 may be selectively removed from the fluid storage vessel 12 by opening a valve (e.g., the automated valve 50) to permit the first fluid 42 to flow out of the fluid outlet 16 as waste until the second fluid 44 begins to flow out of the fluid outlet 16.

In some examples, it is desirable to maximize the volume of the second fluid 44 that remains in the fluid storage vessel 12 while minimizing (or eliminating) the volume of the first fluid 42 that remains in the fluid storage vessel 12. Stated differently, in some examples, the automated fluid flow control system 104 may be configured to reduce and/or minimize the volume of the second fluid 44 that flows out of the fluid outlet 16 subsequent to the first fluid 42 flowing out of the fluid outlet 16. Stated another way, the automated fluid flow control system 104 may be configured to actuate the automated valve 50 to regulate the flow of the fluid 40 through the fluid conduit 14 and/or out of the fluid outlet 16 to cease the flow through the fluid conduit 14 when the fluid 40 within the primary ultrasonic signal path 30 transitions from the first fluid 42 to the second fluid 44.

As more specific examples, the automated fluid flow control system 104 may be configured to actuate the automated valve 50 such that the volume of the second fluid 44 that flows out of the fluid outlet 16 is at most ten gallons (38 liters (L)), at most five gallons (19 L), at most two gallons (7.6 L), at most one gallon (3.8 L), at most 0.5 gallons (1.9 L), at most 0.25 gallons (1 L), and/or at most 0.125 gallons (0.47 L). As additional examples, the automated fluid flow control system 104 may be configured to actuate the automated valve 50 such that the volume of the second fluid 44 that flows out of the fluid outlet 16 is at most 2% of the capacity of the fluid storage vessel 12, at most 1% of the capacity of the fluid storage vessel 12, at most 0.5% of the capacity of the fluid storage vessel 12, at most 0.1% of the capacity of the fluid storage vessel 12, at most 0.05% of the capacity of the fluid storage vessel 12, and/or at most 0.01% of the capacity of the fluid storage vessel 12.

To achieve this, the automated valve 50 can be actuated from the open state to the closed state very quickly after the first fluid 42 has fully exited the fluid storage vessel 12. In some cases, however, the flow rate of the second fluid 44 through the fluid conduit 14 is much higher than that of the first fluid 42, such that a delay in actuating the automated valve 50 can result in the loss of a large volume of the second fluid 44. Accordingly, the automated fluid flow control system 104 may be used to automatically actuate the automated valve 50 at a time associated with a reduced or minimized loss of the second fluid 44 and without the risks associated with human error and human reaction times. As more specific examples, the automated fluid flow control system 104 may be configured to automatically actuate the automated valve 50 within an interval of time subsequent to the fluid 40 within the primary ultrasonic signal path 30 transitioning from the first fluid 42 to the second fluid 44 that is at most 1 second (s), at most 500 milliseconds (ms), at most 100 ms, at most 50 ms, and/or at most 10 ms, The signal generation and analysis assembly 200 may be configured to generate and transmit the valve actuation signal 220 responsive to any suitable detected change in the fluid properties of the fluid 40 within the fluid conduit 14, such as may be represented by the received electrical signal 204. For example, in an example in which the first fluid 42 is significantly more dense than the second fluid 44, the first fluid 42 may operate to attenuate the magnitude of the transmitted ultrasonic signal 112 to a significantly greater degree than the second fluid 44. Accordingly, in some examples, the fluid monitoring system 100 may be configured to measure and/or otherwise characterize a degree to which the fluid 40 attenuates the transmitted ultrasonic signal 112 as the signal propagates from the ultrasonic transmitter 110 to the ultrasonic receiver 120.

The attenuation of the transmitted ultrasonic signal 112 may be measured and/or characterized in any suitable manner. In particular, in some examples, the fluid properties measured by the signal generation and analysis assembly 200 may include an acoustic transmissivity of the fluid 40, with a relatively low acoustic transmissivity generally corresponding to a relatively large degree of signal attenuation. Accordingly, an abrupt increase in the measured acoustic transmissivity of the fluid 40 may correspond to the fluid 40 within the fluid conduit 14 transitioning from the relatively dense first fluid 42 to the less dense second fluid 44, and thus may be used to trigger the generation of the valve actuation signal 220.

More specifically, in some examples, the signal generation and analysis assembly 200 is configured to generate the valve actuation signal 220 responsive to the measured acoustic transmissivity exceeding a threshold transmissivity. In such examples, the threshold transmissivity may be a predetermined threshold transmissivity, and/or may be a predetermined proportion of an initial acoustic transmissivity of the fluid 40 (e.g., a transmissivity that is at least 50% greater than the initial acoustic transmissivity). The initial acoustic transmissivity may be measured with the fluid monitoring system 100, may be a predetermined initial acoustic transmissivity, and/or may be a user-defined initial acoustic transmissivity.

The fluid monitoring system 100 and/or the signal generation and analysis assembly 200 may be configured to measure the acoustic transmissivity of the fluid 40, and/or to otherwise characterize the attenuation of the transmitted ultrasonic signal 112, in any suitable manner. For example, the fluid monitoring system 100 and/or the signal generation and analysis assembly 200 may be configured to measure a received amplitude (e.g., a root-mean-square (RMS) amplitude) of the received ultrasonic signal 122 and to compare the received amplitude to a transmitted amplitude (e.g., an RMS amplitude) of the transmitted ultrasonic signal 112. As a more specific example, calculating a ratio of the received amplitude to the transmitted amplitude may provide a quantitative measurement of a degree to which the transmitted ultrasonic signal 112 is attenuated before becoming the received ultrasonic signal 122, and/or of the acoustic transmissivity of the fluid 40.

In other examples, the fluid monitoring system 100 and/or the signal generation and analysis assembly 200 may be configured to characterize the attenuation of the acoustic transmissivity of the fluid 40 based on the received ultrasonic signal 122 and/or the received electrical signal 204 alone (e.g., without performing a comparison to an amplitude of the transmitted ultrasonic signal 112). For example, the amplitude of the received electrical signal 204 may itself represent and/or reflect a degree of attenuation of the transmitted ultrasonic signal 112 in the sense that a greater degree of attenuation generally correlates to a diminished amplitude of the received electrical signal 204. Accordingly, the amplitude of the received electrical signal 204 itself may be regarded as being directly related and/or proportional to the acoustic transmissivity of the fluid 40. Thus, in some examples, a suitably abrupt increase in the measured amplitude of the received electrical signal 204 (e.g., by at least 50%) may be used to trigger the actuation of the automated valve 50.

Figure 4:
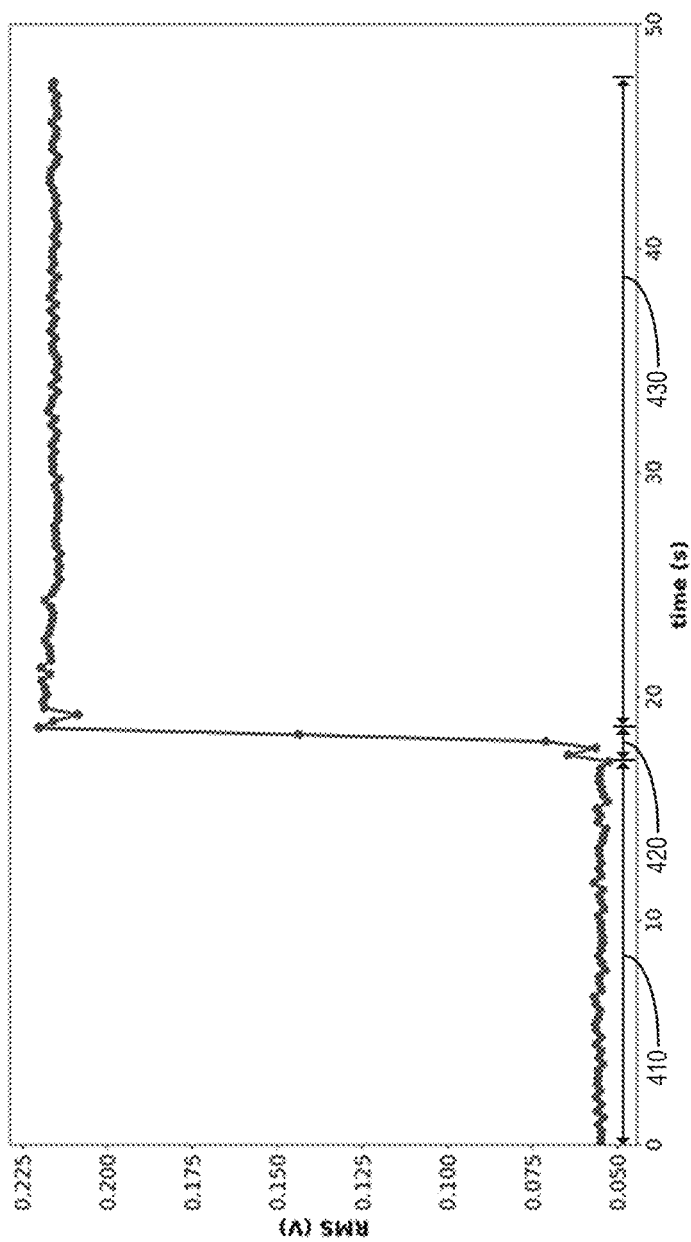
FIG. 4 is an example of a graph depicting the amplitude of a received electrical signal as a function of time during use of a fluid monitoring system to detect a transition between a slurry and a non-slurry.

As a more specific example, FIG. 4 illustrates an example of a graph that depicts an RMS amplitude of the received ultrasonic signal 122 as a function of time. Specifically, in the example of FIG. 4, the RMS amplitude of the received ultrasonic signal 122 is represented as the RMS amplitude of the received electrical signal 204. In this manner, FIG. 4 may be described as representing an example of a set of data that is recorded and/or calculated by the fluid monitoring system 100 during an operation to detect a transition from the first fluid 42 to the second fluid 44.

The time period in which the data of FIG. 4 were recorded may be partitioned into multiple intervals, including a first interval 410, a second interval 430, and a transition interval 420. Specifically, the first interval 410 corresponds to an interval in which the fluid 40 flowing through the fluid conduit 14 between the ultrasonic transmitter 110 and the ultrasonic receiver 120 is the first fluid 42. The second interval 430 corresponds to an interval in which the fluid 40 flowing through the fluid conduit 14 between the ultrasonic transmitter 110 and the ultrasonic receiver 120 is the second fluid 44. The transition interval 420 corresponds to an interval in which the fluid 40 flowing through the fluid conduit 14 between the ultrasonic transmitter 110 and the ultrasonic receiver 120 transitions from the first fluid 42 to the second fluid 44, and/or when this fluid 40 includes a mixture of the first fluid 42 and the second fluid 44.

In the example of FIG. 4, the second fluid 44 has a significantly higher acoustic transmissivity than the first fluid 42, such that the RMS amplitude of the received electrical signal 204 is significantly higher during the second interval 430 than during the first interval 410. Accordingly, the fluid monitoring system 100 may be configured to detect such an increase in the RMS amplitude and to trigger the generation and transmission of the valve actuation signal 220 responsive to detecting such an increase.

As shown in FIG. 4, the transition interval 420 may be very brief, such as an interval that is about equal to, shorter than, or much shorter than one second. In some examples, the signal generation and analysis assembly 200 is configured to measure the amplitude of the received ultrasonic signal 122 and/or of the received electrical signal 204 at a sufficiently high sampling rate that one or more data points are recorded during the transition interval.

The signal generation and analysis assembly 200 may be configured and/or programmed to detect an increase in the RMS amplitude of the received electrical signal 204 in any suitable manner. For example, the signal generation and analysis assembly 200 may be configured to generate the valve actuation signal 220 responsive to the RMS amplitude of the received electrical signal 204 exceeding a threshold amplitude, such as a predetermined threshold transmissivity and/or an amplitude that is a predetermined proportion of an initial RMS amplitude. Additionally, or alternatively, the signal generation and analysis assembly 200 may be configured to generate the valve actuation signal 220 responsive to detecting that the RMS amplitude of the received electrical signal 204 has increased by at least 50%, at least 100%, at least 150%, at least 200%, and/or at least 300%.

As another example, the signal generation and analysis assembly may be configured to generate the valve actuation signal 220 responsive to a rate of change in the RMS amplitude of the received electrical signal 204 (e.g., a first time derivative of the measured RMS amplitude) exceeding a threshold rate of change. In such examples, any suitable threshold rate of change may be utilized, such as a rate of change that is at least 200% of a previously measured rate of change, at least 500% of a previously measured rate of change, and/or at least 1,000% of a previously measured rate of change. In such examples, and with reference to FIG. 4, the signal generation and analysis assembly 200 may be configured to generate the valve actuation signal 220 during the transition interval 420 or at the beginning of the second interval 430.

While the present disclosure generally relates to examples in which the automated fluid flow control system 104 (when present) automatically actuates the automated valve 50 from the open state to the closed state, this is not required of all examples of the automated fluid flow control system 104. For example, it also is within the scope of the present disclosure that the automated fluid flow control system 104 may be configured to automatically transition the automated valve 50 from the closed state to the open state, and/or to automatically transition the automated valve 50 among any of a variety of intermediate states defined between the (fully) open state and the (fully) closed state.

When present, the automated valve 50 may include and/or be any of a variety of valves for regulating a fluid flow responsive to receipt of the valve actuation signal 220, examples of which include a solenoid valve, a ball valve, a butterfly valve, a globe valve, and/or a knife gate valve.

The ultrasonic transmitter 110 and the ultrasonic receiver 120 may operate in any of a variety of manners to probe the fluid 40. In some examples, the transmitted ultrasonic signal 112 transmitted by the ultrasonic transmitter 110 is at least partially based on the transmitted electrical signal 202, and the received electrical signal 204 is at least partially based on the received ultrasonic signal 122 that is received by the ultrasonic receiver 120. More specifically, the ultrasonic transmitter 110 may be configured to generate the transmitted ultrasonic signal 112 by converting the transmitted electrical signal 202 into the transmitted ultrasonic signal 112. Similarly, the ultrasonic receiver 120 may be configured to generate the received electrical signal 204 by converting the received ultrasonic signal 122 into the received electrical signal 204.

Each of the transmitted ultrasonic signal 112 and the received ultrasonic signal 122 may include and/or be an ultrasonic acoustic wave that propagates within the fluid 40. In particular, the transmitted ultrasonic signal 112 may include an ultrasonic acoustic wave that is transmitted from the ultrasonic transmitter 110 to the fluid 40 via the vessel 10. Similarly, the received ultrasonic signal 122 may include an ultrasonic acoustic wave that is transmitted from the fluid 40 to the ultrasonic receiver 120 via the vessel 10, and thus that is incident upon the ultrasonic receiver 120 from the vessel 10.

In this manner, each of the ultrasonic transmitter 110 and the ultrasonic receiver 120 may be acoustically coupled to the fluid 40 only via the vessel 10, such that the fluid monitoring system 100 may probe the fluid 40 without directly contacting the fluid 40. Accordingly, the fluid monitoring system 100 may be configured such that every portion and/or component of the fluid monitoring system 100 is fluidly isolated from the fluid 40. Stated differently, the fluid monitoring system 100 may be configured such that no portion of the fluid monitoring system 100 comes into direct contact with the fluid 40 during operative use thereof.

While the present disclosure generally relates to examples in which every component of the fluid monitoring system 100 is fluidly isolated from the fluid 40 and/or positioned external of the vessel 10 during operative use of the fluid monitoring system 100, this is not required of all examples of the fluid monitoring system 100. For example, it also is within the scope of the present disclosure that the ultrasonic transmitter 110 and/or the ultrasonic receiver 120 may be positioned inside the vessel 10, such as on an interior wall of the vessel 10 and/or in direct contact with the fluid 40.

Additionally, or alternatively, the ultrasonic transmitter 110 and/or the ultrasonic receiver 120 may be comprised in and/or encapsulated in a probe that is received within the vessel 10.

As described in more detail herein, the signal generation and analysis assembly 200 generally is configured to determine one or more fluid properties of the fluid 40 and/or to detect a variation of the received electrical signal 204 as a result of the influence of the fluid 40 upon the transmitted ultrasonic signal 112. In particular, as a result of the influence of the fluid 40, the received ultrasonic signal 122 may represent a time-delayed version of the transmitted ultrasonic signal 112, an attenuated version of the transmitted ultrasonic signal 112, a frequency-filtered version of the transmitted ultrasonic signal 112, and/or a frequency-shifted version of the transmitted ultrasonic signal 112. As a more specific example, measuring the time interval separating the time at which the ultrasonic transmitter 110 transmits the transmitted ultrasonic signal 112 and the time at which the ultrasonic receiver 120 receives the received ultrasonic signal 122 can yield and/or enable a measurement of the speed of sound through the fluid 40, and thus a determination of the density of the fluid 40. As another example, one or more properties of the fluid 40 may be measured by comparing the received ultrasonic signal 122 to the transmitted ultrasonic signal 112 (e.g., by comparing the received electrical signal 204 to the transmitted electrical signal 202), such as by comparing the amplitudes and/or waveform profiles of the ultrasonic signals.

As schematically illustrated in FIGS. 1-3, each of the ultrasonic transmitter 110 and the ultrasonic receiver 120 may be configured to be operatively coupled to a surface 20 of the vessel 10. In some examples, and as schematically illustrated in FIGS. 1-3, the surface 20 may be an external surface of the vessel 10. This is not required of all examples, however, and it additionally is within the scope of the present disclosure that the surface 20 may be an internal surface of the vessel 10. In such examples, the internal surface may be a surface that is in direct contact with the fluid 40 or may be a surface that is fluidly isolated from the fluid 40. Stated differently, in some examples, the ultrasonic transmitter 110 and/or the ultrasonic receiver 120 may be operatively coupled to an internal surface of the vessel 10 such that the ultrasonic transmitter 110 and/or the ultrasonic receiver 120 is not in direct contact with the fluid 40.

In some examples, the fluid monitoring system 100 may be configured such that the ultrasonic transmitter 110 and the ultrasonic receiver 120 are operatively coupled to opposing sides of the vessel 10 during operative use of the fluid monitoring system 100. In such a configuration, and as schematically illustrated in FIGS. 1-2, the primary ultrasonic signal path 30 may extend between the opposing sides of the vessel 10, such as along a straight line connecting the ultrasonic transmitter 110 and the ultrasonic receiver 120. Stated differently, the ultrasonic transmitter 110 and the ultrasonic receiver 120 may be positioned such that the ultrasonic receiver 120 is at least substantially aligned with the primary ultrasonic signal path 30.

In some examples, the vessel 10 and/or the fluid 40 also will support additional signal paths along which an ultrasonic signal may travel from the ultrasonic transmitter 110 to the ultrasonic receiver 120. For example, and as schematically illustrated in FIG. 2, the vessel 10 and/or the fluid 40 may support a secondary ultrasonic signal path 32, such as a path that follows an edge of the vessel 10. Such a path also may be referred to herein as a guided ultrasonic signal path 32 and/or as a circumferential ultrasonic signal path 32. In some examples, and as described in more detail below, the signal generation and analysis assembly 200 is configured to isolate a signal that is associated with the primary ultrasonic signal path 30 and/or to exclude a signal that is associated with the secondary ultrasonic signal path 32 (and/or any other undesired signal path)

The ultrasonic transmitter 110 and the ultrasonic receiver 120 each may include and/or be any suitable device, such as an ultrasonic transducer. In some examples, each of the ultrasonic transmitter 110 and the ultrasonic receiver 120 includes and/or is an ultrasonic transducer that may be used as either of the ultrasonic transmitter 110 or the ultrasonic receiver 120. Stated differently, in such examples, the ultrasonic transmitter 110 and the ultrasonic receiver 120 may be at least substantially identical devices aside from their use as either the ultrasonic transmitter 110 or the ultrasonic receiver 120. An example of such an ultrasonic transducer may include the V101 0.5 megahertz (MHz) 1-inch contract transducer marketed by Olympus Scientific Solutions of Waltham, Massachusetts. Additionally, or alternatively, each of the ultrasonic transmitter 110 and/or the ultrasonic receiver 120 may include and/or be an ultrasonic transducer that is configured to generate and/or receive an ultrasonic signal with a frequency that is at least 100 kilohertz (kHz), at least 300 kHz, at least 500 kHz, at least 1 MHz, at least 3 MHz, at most 5 MHz, at most 2 MHz, at most 700 kHz, and/or at most 200 kHz.

In some examples, the ultrasonic transmitter 110 and/or the ultrasonic receiver 120 includes and/or is a linear ultrasonic transducer. For example, the ultrasonic transmitter 110 may be configured to convert the transmitted electrical signal 202 into the transmitted ultrasonic signal 112 via a linear operation of a single input variable, such that a voltage profile of the transmitted electrical signal 202 and an acoustic amplitude profile of the transmitted ultrasonic signal 112 are at least substantially identical in shape. Similarly, the ultrasonic receiver 120 may be configured to convert the received ultrasonic signal 122 into the received electrical signal 204 via a linear operation of a single input variable, such that a voltage profile of the received electrical signal 204 and an acoustic amplitude profile of the received ultrasonic signal 122 are at least substantially identical in shape.

As used herein, the term "profile," as used to characterize a quantity that varies in space and/or time, refers to a shape of such a quantity when plotted against the spatial and/or temporal dimensions along which the quantity varies. In the present disclosure, references to acoustic and/or electrical signals typically refer to single-valued functions of a single independent variable (e.g., distance or time). As examples, each of the transmitted electrical signal 202 and the received electrical signal 204 generally refers to a time-series data set representing a voltage level.

As additional examples, each of the transmitted ultrasonic signal 112 and the received ultrasonic signal 122 typically refers to a time-series data set representing an acoustic amplitude. That is, while each of the transmitted ultrasonic signal 112 and the received ultrasonic signal 122 is associated with an acoustic excitation that propagates in three spatial dimensions within the fluid 40, the transmitted ultrasonic signal 112 and the received ultrasonic signal 122 may be understood as referring to the instantaneous amplitudes of such excitations (e.g., as transmitted by the ultrasonic transmitter 110 and/or as received by the ultrasonic receiver 120). This is not required of all examples of fluid monitoring systems 100, however, and it additionally is within the scope of the present disclosure that the ultrasonic and/or electrical signals disclosed herein may represent multiple spatial and/or temporal dimensions.

As discussed above, it generally is desirable to operatively couple each of the ultrasonic transmitter 110 and the ultrasonic receiver 120 to the surface 20 of the vessel 10 such that the ultrasonic receiver 120 is precisely aligned with the ultrasonic transmitter 110. In particular, it generally is desirable to position the ultrasonic receiver 120 to be aligned with the primary ultrasonic signal path 30, such as to optimize the acoustic coupling between the ultrasonic transmitter 110 and the ultrasonic receiver 120.

In some examples, such as when the fluid monitoring system 100 includes and/or is the fluid characterization system 102, a suitable positioning of the ultrasonic transmitter 110 and the ultrasonic receiver 120 may include positioning the ultrasonic transmitter 110 and the ultrasonic receiver 120 on opposite sides of the vessel 10, taking care to account for any irregularities of the shape of the vessel 10 and/or to ensure parallelism between the ultrasonic transmitter 110 and the ultrasonic receiver 120.

In some examples, such as when the fluid monitoring system 100 includes and/or is the automated fluid flow control system 104, the vessel 10 to which the ultrasonic transmitter 110 and the ultrasonic receiver 120 are coupled may be sufficiently small (e.g., in diameter) that the ultrasonic transmitter 110 and the ultrasonic receiver 120 may remain operatively coupled to one another (e.g., other than via the vessel 10 alone) during operative use of the fluid monitoring system 100.

In particular, in some examples, and as schematically illustrated in FIGS. 1 and 3, the fluid monitoring system 100 includes a transceiver mount 130 configured to operatively couple each of the ultrasonic transmitter 110 and the ultrasonic receiver 120 to the vessel 10 and/or to one another. In some such examples, the transceiver mount 130 is configured to maintain each of the ultrasonic transmitter 110 and the ultrasonic receiver 120 in static engagement with the vessel 10. The transceiver mount 130 additionally or alternatively may be configured to position the ultrasonic transmitter 110 and the ultrasonic receiver 120 relative to the vessel 10 such that the ultrasonic receiver 120 is positioned at least substantially within the primary ultrasonic signal path 30. When present, the transceiver mount 130 may include and/or be any of a variety of devices and/or mechanisms, examples of which include a jig, a bracket, and/or an adjustable clamp.

While the present disclosure generally pertains to examples in which the ultrasonic transmitter 110 and the ultrasonic receiver 120 are separate, spaced-apart components, this is not required of all examples. For example, it also is within the scope of the present disclosure that a single ultrasonic transceiver can be configured to transmit the transmitted ultrasonic signal 112 as well as to receive the received ultrasonic signal 122 in the manners described herein. In some such examples, the single ultrasonic transceiver may be described as representing each of the ultrasonic transmitter 110 and the ultrasonic receiver 120, and/or may be referred to herein as a combined ultrasonic transceiver.

In some examples, the received ultrasonic signal 122 received by the combined ultrasonic transceiver may include and/or be a reflection of the transmitted ultrasonic signal 122, such as a portion of the transmitted ultrasonic signal 122 that is reflected off of an interior surface of the vessel 10 opposite the combined ultrasonic transceiver. For example, the combined ultrasonic transceiver can receive a portion of the transmitted ultrasonic signal 122 that travels along the primary ultrasonic signal path 30 shown in FIG. 2 and that is reflected back along the primary ultrasonic signal path 30 to the combined ultrasonic transceiver as the received ultrasonic signal 122. Additionally or alternatively, the received ultrasonic signal 122 received by the combined ultrasonic transceiver may include and/or be a portion of the transmitted ultrasonic signal 122 that is guided by the vessel 10, such as along the secondary ultrasonic signal path(s) 32 shown in FIG. 2.

The fluid monitoring system 100 additionally may include, and/or be used in conjunction with, any other suitable materials and/or devices for operatively coupling the ultrasonic transmitter 110 and the ultrasonic receiver 120 to the vessel 10. For example, in some examples, each of the ultrasonic transmitter 110 and the ultrasonic receiver 120 is adhered to the vessel 10 with a shear coupling gel.

The fluid monitoring system 100 may be configured to generate the transmitted electrical signal 202 and/or the transmitted ultrasonic signal 112 to have any of a variety of signal profiles. In some examples, the transmitted electrical signal 202 and/or the transmitted ultrasonic signal 112 includes and/or is a Gaussian pulse. As a more specific example, the transmitted ultrasonic signal 112 may include and/or be a burst of Gaussian pulses with a center frequency of about 0.1-5 MHz, a burst length of about 2.5 microseconds (s), and a bandwidth (a) of about 100 kHz.

It is to be understood, however, that the optimal selection of such parameters generally will depend upon the nature of the vessel 10 and/or of the fluid 40. For example, as the size (e.g., the diameter) of the vessel 10 increases, correspondingly lower frequencies of the transmitted ultrasonic signal 112 may be utilized. In particular, a lower frequency of the transmitted ultrasonic signal 112 generally will correspond with a greater ability of the transmitted ultrasonic signal 112 to penetrate into the fluid 40 across the diameter of the vessel 10, at the expense of a correspondingly diminished measurement resolution. Thus, as examples, using the fluid monitoring system 100 in conjunction with a vessel 10 in the form of fluid storage vessel 12 such as a five-gallon tank may correspond to using a transmitted signal frequency of about 500 kHz, while using the fluid monitoring system 100 in conjunction with a vessel 10 in the form of a 1,000-gallon tank may correspond to using a transmitted signal frequency of about 100 kHz.

Conversely, when the fluid monitoring system 100 is used to probe a comparatively small vessel 10 such as a pipe (e.g., the fluid conduit 14 and/or a vessel with a diameter that is at most 10% the diameter of the fluid storage vessel 12), it may be suitable to generate the transmitted ultrasonic signal 112 with comparatively high frequencies, such as frequencies above 1 MHz. Using such higher frequencies may serve to increase the measurement resolution, as well as to ensure that a sufficient number of wavelengths of the transmitted ultrasonic signal 112 will traverse the vessel 10 between the ultrasonic transmitter 110 and the ultrasonic receiver 120. In some examples, the frequency of the transmitted ultrasonic signal 112 is selected such that the diameter of the vessel 10 is at least five times the wavelength of the transmitted ultrasonic signal 112 within the fluid 40.

The signal generation and analysis assembly 200 may include any of a variety of components, modules, and/or functions for performing the functions and/or methods disclosed herein. As examples, and as schematically illustrated in FIGS. 1-3, the signal generation and analysis assembly 200 may include an electrical signal generator 240 programmed and/or configured to generate the transmitted electrical signal 202 and/or a signal analysis controller 250 programmed and/or configured to receive an input electrical signal 216. Specifically, the signal analysis controller 250 may be programmed and/or configured to calculate the fluid properties of the fluid 40 at least partially based on the input electrical signal 216. In various examples according to the present disclosure, the signal generation and analysis assembly 200 is configured to analyze the input electrical signal 216 via a Gaussian reconstruction scheme.

Additionally, or alternatively, in some examples, and as schematically illustrated in FIGS. 1-3, the signal generation and analysis assembly 200 may include a signal preamplifier 242 programmed and/or configured to receive a base level signal 206 (shown in FIG. 2) and to amplify the base level signal 206 into a preamplified electrical signal 210 (shown in FIG. 2).

Additionally, or alternatively, in some examples, and as schematically illustrated in FIGS. 1-3, the signal generation and analysis assembly 200 may include a signal digitizer 244 programmed and/or configured to receive an analog electrical signal 212 (shown in FIG. 2) and to digitize the analog electrical signal 212 into a digitized electrical signal 214 (shown in FIG. 2).

In some examples in which the fluid monitoring system 100 includes and/or is the automated fluid flow control system 104, and as schematically illustrated in FIGS. 1 and 3, the signal generation and analysis assembly 200 may include an automated valve controller 260 programmed and/or configured to generate and transmit the valve actuation signal 220. Specifically, in some such examples, and as schematically illustrated in FIG. 3, the signal analysis controller 250 is programmed and/or configured to generate and transmit a valve control command 222 to the automated valve controller 260 such that the automated valve controller 260 generates and transmits the valve actuation signal 220 at least partially based on the valve control command 222.

When present, the automated valve controller 260 may include and/or be any suitable device for generating the valve actuation signal 220. As an example, the valve actuation signal 220 may include and/or be an electrical current (e.g., a direct current (DC) signal) that powers the automated valve 50 to transition among two or more states, and the automated valve controller 260 may be a DC power supply (e.g., a programmable DC power supply) that is configured to generate the DC electrical current.

As used herein, two or more of the received electrical signal 204, the base level signal 206, the preamplified electrical signal 210, the analog electrical signal 212, the digitized electrical signal 214, and/or the input electrical signal 216 may refer to the same (e.g., a common) electrical signal. As an example, and as schematically illustrated in FIG. 2, the signal preamplifier 242 may be programmed and/or configured to transmit modified signal 208 to the signal digitizer 244, such that the modified signal 208 represents each of the preamplified electrical signal 210 output by the signal preamplifier 242 and the analog electrical signal 212 input to the signal digitizer 244.

In this manner, as used herein, the modified signal 208 may be understood as representing any signal that is transmitted between two components of the signal generation and analysis assembly 200. Accordingly, and as schematically illustrated in FIG. 2, the modified signal 208 does not necessarily refer to a single signal (e.g., a signal transmitted between two specific components of the signal generation and analysis assembly 200), and multiple distinct signals each may be described as an example of the modified signal 208. Similarly, one or more operations that are performed upon the received electrical signal 204 and/or the modified signal 208 by components of the signal generation and analysis assembly 200 also may be described as updating (e.g., sequentially updating) the modified signal 208.

When present, the electrical signal generator 240 may include and/or be any suitable device, component, module, function, etc. for generating the transmitted electrical signal 202. As examples, the electrical signal generator 240 may include and/or be an arbitrary signal generator and/or an alternating current (AC) voltage generator. Similarly, in some examples, the electrical signal generator 240 may be programmed and/or configured to generate the transmitted electrical signal 202 at least partially in the form of an AC electrical signal. An example of an arbitrary signal generator that may be used as the electrical signal generator 240 is the Tektronix AFG3021 100 MHz Two-Channel Arbitrary Function Generator marketed by Tektronix, Inc. of Beaverton, Oregon.

When present, the signal preamplifier 242 may include and/or be any suitable device, component, module, function, etc. for amplifying the base level signal 206 into the preamplified electrical signal 210. For example, the signal preamplifier 242 may include and/or be an ultrasonic preamplifier. In some examples, and as schematically illustrated in FIG. 2, the base level signal 206 that is received by the signal preamplifier 242 includes and/or is the received electrical signal 204. An example of an ultrasonic preamplifier that may be used as the signal preamplifier 242 is the Olympus Ultrasonic Preamplifier Pulser-Receiver Model 5676 marketed by Olympus Scientific Solutions of Waltham, Massachusetts.

When present, the signal digitizer 244 may include and/or be any suitable device, component, module, function, etc. for digitizing the analog electrical signal 212 into the digitized electrical signal 214. As examples, the signal digitizer 244 may include and/or be a digital-to-analog converter (DAC) and/or an oscilloscope. In some examples, and as schematically illustrated in FIG. 2, the analog electrical signal 212 that is received by the signal digitizer 244 includes and/or is the received electrical signal 204 and/or the preamplified electrical signal 210. An example of an oscilloscope that may be used as the signal digitizer 244 is the Tektronix MDO3012 Mixed Doman Oscilloscope marketed by Tektronix, Inc. of Beaverton, Oregon. Another example of an oscilloscope that may be used as the signal digitizer 244 and/or as the electrical signal generator 240 is the Handyscope HS5 USB Oscilloscope marketed by TiePie Engineering of Sneek, The Netherlands.

When present, the signal analysis controller 250 may include and/or be any suitable device, component, module, function, etc. for calculating the fluid properties of the fluid 40 based on the input electrical signal 216. As examples, the signal analysis controller 250 may include and/or be a computer, a personal computer, a laptop computer, and/or a mobile device. In some examples, and as schematically illustrated in FIGS. 2-3, the input electrical signal 216 that is received by the signal analysis controller 250 includes and/or is the base level signal 206, the preamplified electrical signal 210, the analog electrical signal 212, and/or the digitized electrical signal 214.

While FIG. 2 schematically illustrates the electrical signal generator 240, the signal preamplifier 242, the signal digitizer 244, and the signal analysis controller 250 as being respective components, this is not required of all examples of the signal generation and analysis assembly 200. In particular, in some examples, two or more of the electrical signal generator 240, the signal preamplifier 242, the signal digitizer 244, and/or the signal analysis controller 250 are integrated into a single device, such as in the form of respective functions, modules, subroutines, etc. of the single device. As a more specific example, and as schematically illustrated in FIG. 3, the signal analysis controller 250 may include the signal preamplifier 242 and/or the signal digitizer 244.

In some examples, the signal generation and analysis assembly 200 further includes one or more components, modules, and/or functions for receiving an input from a human user and/or for displaying and/or recording information such as the fluid monitoring report 230. For example, and as schematically illustrated in FIGS. 1-3, the signal generation and analysis assembly 200 may include a user input device 270 programmed and/or configured to receive input from a human user to direct operation of the fluid monitoring system 100. More specifically, and as schematically illustrated in FIGS. 1-2, the user input device 270 may be programmed and/or configured to receive one or more input parameters 271, such as may be used to direct the operation of one or more components of the signal generation and analysis assembly 200. When present, the user input device 270 may include and/or be any of a variety of devices, examples of which include a keyboard, a mouse, a touchpad, a touchscreen, a microphone, a slider, a dial, etc.

Additionally, or alternatively, and as schematically illustrated in FIGS. 1-2, the signal generation and analysis assembly 200 may include a display device 272 programmed and/or configured to provide a visual representation of information such as the fluid monitoring report 230. When present, the display device 272 may include and/or be any of a variety of devices, examples of which include a screen, a touchscreen, a monitor, etc. In some examples, a single device (e.g., a touchscreen) may operate as each of the user input device 270 and the display device 272.

Additionally, or alternatively, and as schematically illustrated in FIGS. 1-2, the signal generation and analysis assembly 200 may include a data recording device 274 programmed and/or configured to record at least a portion of the fluid monitoring report 230 onto a non-transitory storage medium 280. When present, the data recording device 274 may include and/or be any of a variety of devices, examples of which include a printer, an optical medium writer, a magnetic medium writer, a solid-state memory writer, etc.

Additionally, or alternatively, and as schematically illustrated in FIGS. 1-2, the signal generation and analysis assembly 200 may include a data transfer device 276 programmed and/or configured to convey at least a portion of the fluid monitoring report 230 to an external device 282 (e.g., a device that is not a component of the signal generation and analysis assembly 200). When present, the data transfer device 276 may include and/or be any of a variety of devices, examples of which include a data port, a serial data port, a universal serial bus (USB) port, an Ethernet port, a wireless transmitter, etc.

Further details regarding the selection and/or construction of the profile (e.g., the waveform) of the transmitted ultrasonic signal 112, and/or of the operation of components analogous to those of the signal generation and analysis assembly 200, may be found in U.S. patent application Ser. No. 17/035,483, in U.S. Pat. No. 6,467,350, in U.S. Pat. No. 6,644,118, in U.S. Pat. No. 6,644,119, in U.S. Pat. No. 6,889,560, in U.S. Pat. No. 6,959,601, in U.S. Pat. No. 7,228,740, in U.S. Pat. No. 7,963,165, in U.S. Pat. No. 8,176,783, in U.S. Pat. No. 8,166,801, in U.S. Pat. No. 8,640,529, in U.S. Pat. No. 9,404,890, in U.S. Pat. No. 8,820,147, in U.S. Pat. No. 9,354,094, in U.S. patent application Ser. No. 13/225,787, in U.S. Pat. No. 10,088,590, in U.S. Pat. No. 9,234,779, in U.S. patent application Ser. No. 15/563,603, in U.S. patent application Ser. No. 15/563,606, in U.S. patent application Ser. No. 16/318,862, in U.S. Provisional Patent Application Ser. No. 67/734,864, and/or in U.S. patent application Ser. No. 16/495,612, the complete disclosures of which are hereby incorporated by reference herein.

Figure 5:
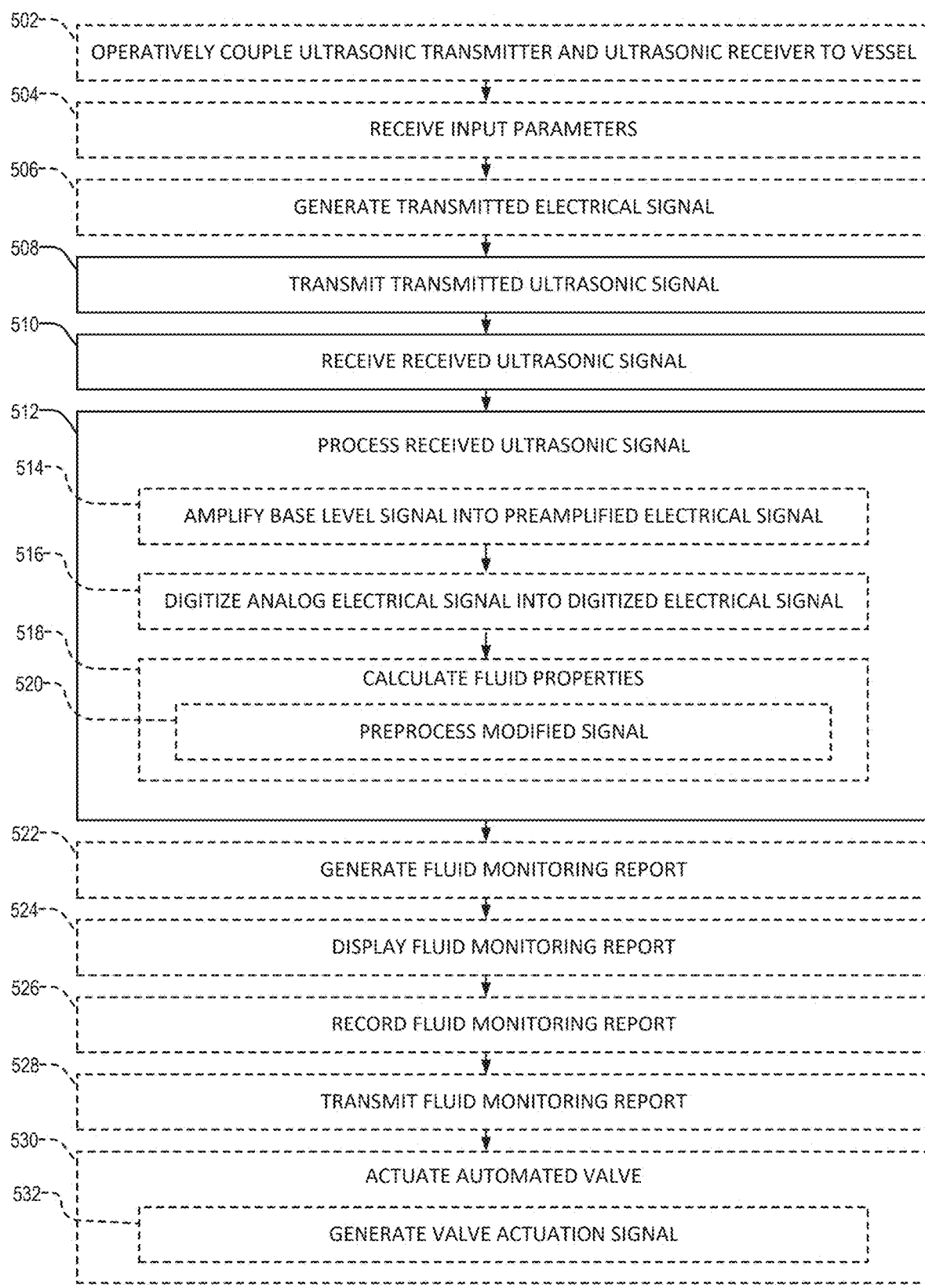
FIG. 5 is a flowchart depicting examples of methods of using a fluid monitoring system.

FIG. 5 is a flowchart depicting examples of a method 300 of using a fluid monitoring system to determine one or more fluid properties of a fluid within a vessel. In some examples, the method 300 pertains to the use of the fluid monitoring system 100, the fluid 40 and/or the vessel 10 discussed above in the context of the fluid monitoring system 100. This is not required, however, and it additionally is within the scope of the present disclosure that the method 300 may be performed in conjunction with any suitable systems, apparatuses, and/or devices.

As shown in FIG. 5, the method 300 includes transmitting, at 508, a transmitted ultrasonic signal through the fluid at least partially along a primary ultrasonic signal path and receiving, at 510, a received ultrasonic signal that is at least partially based on the transmitted ultrasonic signal. The transmitting the transmitted ultrasonic signal at 508 is performed with an ultrasonic transmitter of the fluid monitoring system (such as the ultrasonic transmitter 110 discussed above), while the receiving the received ultrasonic signal at 510 is performed with an ultrasonic receiver of the fluid monitoring system (such as the ultrasonic receiver 120 discussed above).

As further shown in FIG. 5, the method 300 additionally includes processing, at 512, a received electrical signal (such as the received electrical signal 204 discussed above) that is at least partially based on the received ultrasonic signal. The processing the received electrical signal at 512 is performed with a signal generation and analysis assembly, such as the signal generation and analysis assembly 200 discussed above. As described in more detail herein, the processing the received electrical signal at 512 includes determining the fluid properties of the fluid within the vessel.

Similar to the above discussion of the fluid monitoring system 100, the method 300 additionally may include generating the received electrical signal with the ultrasonic receiver at least partially based on the received ultrasonic signal. Additionally, or alternatively, the method 300 may include receiving the received electrical signal from the ultrasonic receiver with the signal generation and analysis assembly.

In some examples, and as shown in FIG. 5, the method 300 additionally includes generating, at 506, a transmitted electrical signal (such as the transmitted electrical signal 202 discussed above) and transmitting the transmitted electrical signal to the ultrasonic transmitter. In such examples, the generating the transmitted electrical signal at 506 is performed with the signal generation and analysis assembly and is performed such that the transmitted ultrasonic signal is at least partially based on the transmitted electrical signal. More specifically, in some examples, the generating the transmitted electrical signal at 506 is performed with an electrical signal generator of the signal generation and analysis assembly, such as the electrical signal generator 240 discussed above.

In some examples, and as shown in FIG. 5, the method 300 additionally includes generating, at 522, a fluid monitoring report (such as the fluid monitoring report 230 discussed above) that represents the fluid properties of the fluid.

The generating the fluid monitoring report at 522 is performed with the signal generation and analysis assembly.

The method 300 may include measuring and/or determining any of a variety of fluid properties of the fluid. As examples, the determining the fluid properties of the fluid may include determining a speed of sound in the fluid, a density of the fluid, a specific gravity of the fluid, an acoustic transmissivity of the fluid, and/or an acoustic resistivity of the fluid. In particular, determining a speed of sound in the fluid, such as by measuring a time delay between transmitting the transmitted ultrasonic signal and receiving the received ultrasonic signal, may enable calculation of the density and/or specific gravity of the fluid.

In some examples, the determining the fluid properties includes monitoring a state and/or a level of progress of a chemical process in the fluid, such as a fermentation process. As a more specific example, the fluid monitoring system may include and/or be a fluid characterization system (such as the fluid characterization system 102 discussed above) that monitors one or more fluid properties of the fluid to determine whether a chemical process such as a fermentation process has concluded.

Additionally, or alternatively, in some examples, the generating the fluid monitoring report includes generating a representation of a change of one or more of the fluid properties of the fluid. As an example, when the method 300 is applied toward monitoring the progress of a fermentation process, the generating the fluid monitoring report at 522 may include providing an indication of the evolution of one or more fluid properties related to the fermentation process (e.g., density, specific gravity, etc.) over time. In this manner, the method 300 may be performed to determine when the fermentation process has concluded by determining that such fluid properties have ceased to vary in time, and/or that a rate of change of such properties has fallen below a threshold rate of change.

In some examples, the determining the fluid properties may include measuring one or more properties that are not directly related to the transmitted ultrasonic signal. For example, when the fluid is a liquid undergoing a fermentation process, the fermentation process itself may generate quiescent acoustic excitations within the fluid, such as via the release of carbon dioxide. In such examples, the presence of such acoustic excitations may serve to indicate that the fermentation process has not yet concluded. Moreover, in some such examples, one or more properties of such quiescent acoustic excitations may offer an indication as to the state and/or progress of the fermentation process. Accordingly, in some examples, the determining the fluid properties may include determining an amplitude (e.g., an RMS amplitude) of a quiescent acoustic signal propagating within the fluid and/or a frequency of the quiescent acoustic signal. The RMS amplitude in particular may be related to the fermentation activity and production of carbon dioxide, as the signal is distorted and attenuated from fermentation activity, but becomes less impeded as fermentation settles down.

In some examples, the fluid monitoring system may include and/or be an automated fluid flow control system (such as the automated fluid flow control system 104 discussed above) that uses the measured fluid properties to automate control of one or more devices. As a more specific example, and as discussed above, the automated fluid flow control system may be configured to automatically actuate an automated valve (such as the automated valve 50 discussed above) to regulate a flow of fluid through the vessel. In particular, such a system may be used to automatically close the automated valve upon detecting that the fluid within the vessel has transitioned from a first fluid with a first set of fluid properties to a second fluid with a second set of fluid properties. Accordingly, in some examples, and as shown in FIG. 5, the method 300 includes actuating, at 530, the automated valve. In such examples, the actuating the automated valve at 530 may include actuating the automated valve from an open state to a closed state, actuating the automated valve from the closed state to the open state, and/or actuating the automated valve among any of a plurality of intermediate states defined between the (fully) open state and the (fully) closed state.

The transmitting the transmitted ultrasonic signal at 508 may include transmitting the transmitted ultrasonic signal in any suitable form. For example, the transmitting the transmitted ultrasonic signal at 508 may include transmitting a Gaussian pulse.

In some examples, the transmitting the transmitted ultrasonic signal at 508 includes generating, with the ultrasonic transmitter, an ultrasonic acoustic wave and transmitting the ultrasonic acoustic wave to the fluid via the vessel. In some examples, the generating the ultrasonic acoustic wave is at least partially based on the transmitted electrical signal. In particular, in some examples, the generating the ultrasonic acoustic wave includes using the ultrasonic transmitter to convert the transmitted electrical signal into the transmitted ultrasonic signal. The generating the ultrasonic acoustic wave may include generating such that an acoustic amplitude profile of the transmitted ultrasonic signal is at least substantially similar in shape to a voltage profile of the transmitted electrical signal.

Similarly, the receiving the received ultrasonic signal at 510 may include receiving, with the ultrasonic receiver, an ultrasonic acoustic wave from the vessel, such as an ultrasonic acoustic wave that originated as the transmitted ultrasonic signal. That is, the receiving the received ultrasonic signal at 510 may include receiving, with the ultrasonic receiver, a portion of the transmitted ultrasonic signal that traverses a portion of the volume of the fluid that extends between the ultrasonic transmitter and the ultrasonic receiver.

In some examples, the generating the received electrical signal includes using the ultrasonic receiver to convert the received ultrasonic signal into the received electrical signal. The generating the received electrical signal may include generating such that a voltage profile of the received electrical signal is at least substantially similar in shape to an acoustic amplitude profile of the received ultrasonic signal.

The received ultrasonic signal may be based upon and/or related to the transmitted ultrasonic signal in any of a variety of manners. Accordingly, in some examples, the receiving the received ultrasonic signal at 510 includes receiving a time-delayed version of the transmitted ultrasonic signal, receiving an attenuated version of the transmitted ultrasonic signal, and/or receiving a frequency-shifted version of the transmitted ultrasonic signal.

In some examples, the method 300 is performed in such a manner that no component of the fluid monitoring system comes into direct contact with the fluid. Stated differently, the method 300 may be performed while every portion of the fluid monitoring system is fluidly isolated from the fluid, such as by positioning every component of the fluid monitoring system external of the vessel containing the fluid. Accordingly, in some examples, the transmitting the transmitted ultrasonic signal at 508 includes transmitting the transmitted ultrasonic signal through the fluid via a surface of the vessel, such as an internal surface of the vessel, and external surface of the vessel, and/or the surface 20 discussed above. Similarly, in some examples, the receiving the received ultrasonic signal at 510 includes receiving the received ultrasonic signal from the fluid via the surface of the vessel.

In some examples, and as shown in FIG. 5, the method 300 includes, prior to the transmitting the transmitted ultrasonic signal at 508, operatively coupling, at 502, each of the ultrasonic transmitter and the ultrasonic receiver to the vessel. In some such examples, the operatively coupling the ultrasonic transmitter and the ultrasonic receiver to the vessel at 502 includes coupling such that the ultrasonic transmitter and the ultrasonic receiver are coupled to opposing sides of the vessel. In this manner, the operatively coupling the ultrasonic transmitter and the ultrasonic receiver to the vessel at 502 may be performed such that the primary ultrasonic signal path extends between the opposing sides of the vessel, and such that the ultrasonic receiver is positioned within, and/or at least substantially aligned with, the primary ultrasonic signal path. In some examples, the coupling the ultrasonic transmitter and the ultrasonic receiver to the vessel at 502 includes adhering one or both of the ultrasonic transmitter and the ultrasonic receiver to the surface of the vessel with a shear coupling gel.

In some examples, such as in an example in which a diameter of the vessel is relatively small (e.g., less than about 10 centimeters (cm)), the operatively coupling the ultrasonic transmitter and the ultrasonic receiver to the vessel at 502 may include coupling with a transceiver mount, such as the transceiver mount 130 discussed above.

The processing the received electrical signal at 512 may be performed in any of a variety of manners. In some examples, the signal generation and analysis assembly includes a signal preamplifier for amplifying the electrical signal generated by the ultrasonic receiver. Accordingly, in some such examples, and as shown in FIG. 5, the processing the received electrical signal at 512 includes receiving base level signal and amplifying, at 514, the base level signal into a preamplified electrical signal with the signal preamplifier. In some examples, the base level signal includes and/or is the received electrical signal. Examples of signal preamplifiers, of base level signals, and/or of preamplified electrical signals that may be used in the method 300 are disclosed herein with reference to the signal preamplifier 242, the base level signal 206, and/or the preamplified electrical signal 210, respectively.

In some examples, the signal generation and analysis assembly includes a signal digitizer for converting an analog signal into a digital signal, such as may be required for analyzing the signal with a computing device. Accordingly, in some such examples, and as shown in FIG. 5, the processing the received electrical signal at 512 includes receiving an analog electrical signal and digitizing, at 516, the analog electrical signal into a digitized electrical signal with the signal digitizer. In some examples, the analog electrical signal includes and/or is the received electrical signal and/or the preamplified electrical signal. Examples of signal digitizers, of analog electrical signals, and/or of digitized electrical signals that may be used in the method 300 are disclosed herein with reference to the signal digitizer 244, the analog electrical signal 212, and/or the digitized electrical signal 214, respectively.

In some examples, the signal generation and analysis assembly includes a signal analysis controller for analyzing the information represented by the received electrical signal. Accordingly, in some such examples, and as shown in FIG. 5, the processing the received electrical signal at 512 includes receiving an input electrical signal and calculating, at 518, the fluid properties of the fluid with the signal analysis controller. In such examples, the calculating the fluid properties at 518 is at least partially based on the input electrical signal. In some examples, the input electrical signal includes and/or is the received electrical signal, the base level signal, the preamplified electrical signal, the analog electrical signal, and/or the digitized electrical signal. Examples of signal analysis controllers and/or of input electrical signals that may be used in the method 300 are disclosed herein with reference to the signal analysis controller 250 and/or the input electrical signal 216, respectively.

The calculating the fluid properties at 518 may be performed in any of a variety of manners. In some examples, and as shown in FIG. 5, the calculating the fluid properties at 518 includes preprocessing, at 520, a modified signal (such as the modified signal 208 disclosed herein) that is at least partially based on the electrical signal. In such examples, the preprocessing the modified signal at 520 is performed by the signal analysis controller. As discussed above, one or more steps of the preprocessing the modified signal at 520 may be described as operating to update (e.g., to sequentially update and/or revise) the modified signal.

In some examples, the preprocessing the modified signal at 520 includes subtracting a reference data signal from the input electrical signal and/or from the modified signal. For example, the input electrical signal and/or the modified signal may include and/or represent signals that are not relevant to the determination of the fluid properties, such as background noise. Accordingly, in the event that such a reference data signal is known and/or measurable, such a reference data signal may be subtracted from the input electrical signal and/or from the modified signal so as to further isolate the relevant portion of the signal.

Additionally, or alternatively, in some examples, the preprocessing the modified signal at 520 includes subtracting a mean value from the input electrical signal and/or from the modified signal. In this manner, the signal resulting from such a subtraction may have a mean value of zero, which in turn may simplify and/or facilitate further processing of the signal.

Additionally, or alternatively, in some examples, the preprocessing the modified signal at 520 includes applying a bandpass filter to the input electrical signal and/or to the modified signal. For example, the portion of the input electrical signal and/or of the modified signal that is relevant to the calculation of the fluid properties may be known to be present only in a particular band of frequencies contained within the signal. Accordingly, by filtering out frequencies not of interest, such as by applying the bandpass filter, the relevant signal may further be isolated.

In some examples, the bandpass filter may be any of a variety of bandpass filters, examples of which include a highpass filter, a lowpass filter, a type I Chebyshev filter, a type II Chebyshev filter, a Butterworth filter, an elliptic filter, etc. In particular, using a type II Chebyshev filter may facilitate minimizing ripple in the passband while filtering out low and high frequency noise.

Additionally, or alternatively, in some examples, the preprocessing the modified signal at 520 includes gating the input electrical signal and/or the modified signal based on an expected time of flight of the transmitted ultrasonic signal through the fluid and/or through the vessel. In particular, in some examples, the approximate speed of sound at which an ultrasonic signal and/or pulse propagates through the fluid may be known, which in turn may enable the calculation and/or determination of an expected arrival time of the received ultrasonic signal subsequent to transmitting the transmitted ultrasonic signal. Thus, in such examples, the portion of the input electrical signal and/or of the modified electrical signal corresponding to the received ultrasonic signal may further be isolated by eliminating and/or rejecting a portion of the input electrical signal and/or of the modified electrical signal that was not received within a given time interval around the expected arrival time.

More specifically, in some examples, the gating the input electrical signal and/or the modified signal corresponds to isolating a portion of the input electrical signal and/or of the modified signal that corresponds to a portion of the received ultrasonic signal that in turn represents propagation of the transmitted ultrasonic signal along the primary ultrasonic signal path. Stated differently, the gating may be performed to reject signals corresponding to received ultrasonic signals that correspond to propagation of the transmitted ultrasonic signal along other propagation modes, such as along the secondary ultrasonic signal path 32 discussed herein.

Additionally, or alternatively, in some examples, the pre-processing the modified signal includes performing a Hilbert transform on the input electrical signal and/or on the modified signal, normalizing the input electrical signal and/or the modified signal, and/or performing a peak-finding analysis on the input electrical signal and/or the modified signal. In particular, in some examples, performing the peak-finding analysis includes discarding peaks of the modified signal (e.g., the Hilbert-transformed signal) that do not satisfy a predetermined peak profile.

In some examples, one or more aspects of the fluid monitoring system and/or of the method 300 are operated and/or performed at least partially based on user-defined parameters and/or instructions. For example, and as discussed above, the signal generation and analysis assembly may include a user input device (such as the user input device 270 discussed above) for receiving user inputs. In such examples, and as shown in FIG. 5, the method 300 may include receiving, at 504, one or more input parameters from a human user with the user input device. In some such examples, the calculating the fluid properties at 518 is at least partially based on such input parameters.

As an example, in an example in which the method 300 is performed to determine when a fermentation process in a given batch of beer has concluded, the input parameters may include information pertaining to the fermentation of a similar prior batch of beer.

As another example, the expected time of flight of the transmitted ultrasonic signal through the fluid will depend on both the speed of sound through the fluid and the distance traveled by the transmitted ultrasonic signal. Thus, a calculation that relies upon this time of flight, such as gating an input electrical signal as discussed above and/or measuring a density of the fluid, further may rely upon this separation distance. Accordingly, in some examples, the receiving the one or more input parameters at 504 may include receiving a separation distance between the ultrasonic transmitter and the ultrasonic receiver, such as may be known and/or measured by the user.

Additionally, or alternatively, in some examples, the signal generation and analysis assembly includes a display device, such as the display device 272 discussed above. In some such examples, and as shown in FIG. 5, the method 300 includes displaying, at 524, at least a portion of the fluid monitoring report with the display device.

Additionally, or alternatively, in some examples, the signal generation and analysis assembly includes a data recording device, such as the data recording device 274 discussed above. In some such examples, and as shown in FIG. 5, the method 300 includes recording, at 526, at least a portion of the fluid monitoring report onto a non-transitory storage medium (such as the storage medium 280 discussed above) with the data recording device.

Additionally, or alternatively, in some examples, the signal generation and analysis assembly includes a data transfer device, such as the data transfer device 276 discussed above. In some such examples, and as shown in FIG. 5, the method 300 includes transmitting, at 528, at least a portion of the fluid monitoring report to an external device (such as the external device 282 discussed above) with the data transfer device.

In examples in which the method 300 includes the actuating the automated valve at 530, this may be performed in any of a variety of manners. For example, the vessel may include and/or be a fluid conduit (such as the fluid conduit 14 discussed above) that fluidly interconnects the automated valve and a fluid storage vessel (such as the fluid storage vessel 12 discussed above). Accordingly, in such examples, the actuating the automated valve at 530 may include regulating a flow of the fluid through the fluid conduit. In some such examples, the actuating the automated valve at 530 further includes regulating the flow of the fluid from the fluid storage vessel through the fluid conduit and out of a fluid outlet (such as the fluid outlet 16 discussed above) that is downstream of the automated valve.

In some examples, and as shown in FIG. 5, the actuating the automated valve at 530 includes generating, at 532, a valve actuation signal (such as the valve actuation signal 220 discussed above) and transmitting the valve actuation signal to the automated valve. In such examples, the generating the valve actuation signal at 532 is at least partially based on the received electrical signal. More specifically, in some such examples, the signal generation and analysis assembly includes an automated valve controller (such as the automated valve controller 260 discussed above), and the generating the valve actuation signal at 532 is performed with the automated valve controller. As a still more specific example, the signal analysis controller may be configured to generate and transmit a valve control command (such as the valve control command 222 discussed above) to the automated valve controller, such that the generating the valve actuation signal at 532 is at least partially based on the valve control command.

In some examples, the generating the valve actuation signal at 532 is performed responsive to the received electrical signal representing a change in the fluid properties of the fluid, such as an indication that the fluid within the primary ultrasonic signal path has transitioned from a first fluid to a second fluid with different fluid properties. As a more specific example, and as discussed above, the first fluid may be a fermentation byproduct that a user wishes to expel from the fluid storage vessel, and the second fluid may be a fermented liquid that the user wishes to maintain in the fluid storage vessel. Accordingly, in some examples, the generating the valve actuation signal at 532 is performed to reduce and/or minimize a volume of the second fluid that exits the fluid outlet.

In some examples, and as discussed above, the fluid properties measured by the signal generation and analysis assembly include a degree to which the fluid attenuates the transmitted ultrasonic signal, such as may be quantified as an acoustic transmissivity of the fluid. In this manner, a measurement of the acoustic attenuation and/or acoustic transmissivity of the fluid may be used to identify whether the fluid within the fluid conduit is either of two fluids with significantly different densities. For example, a measurement of an attenuation of the transmitted ultrasonic signal may be used to indicate whether the fluid within the fluid conduit is a yeast slurry (with a relatively low acoustic transmissivity) or a fermented liquid (with a relatively high acoustic transmissivity).

Accordingly, in some examples, the generating the valve actuation signal at 532 is performed responsive to the measured acoustic transmissivity exceeding a threshold transmissivity. In such examples, the threshold transmissivity may be a predetermined threshold transmissivity. Additionally, or alternatively, the threshold transmissivity may be a predetermined proportion of an initial acoustic transmissivity of the fluid, such as may be measured with the fluid monitoring system, predetermined, or specified by a user.

In an example in which the generating the valve actuation signal at 532 is based upon a measured acoustic attenuation and/or acoustic transmissivity of the fluid, the acoustic attenuation and/or acoustic transmissivity of the fluid may be determined in any suitable manner. For example, the processing the received electrical signal at 512 may include determining and/or measuring a received amplitude (e.g., an RMS amplitude) of the received ultrasonic signal and comparing the received amplitude to a transmitted amplitude (e.g., an RMS amplitude) of the transmitted ultrasonic signal. As a more specific example, the processing the received electrical signal at 512 may include calculating a ratio of the received amplitude to the transmitted amplitude and determining the acoustic attenuation of the fluid and/or the acoustic transmissivity of the fluid at least partially based on this ratio.

Figure 6:
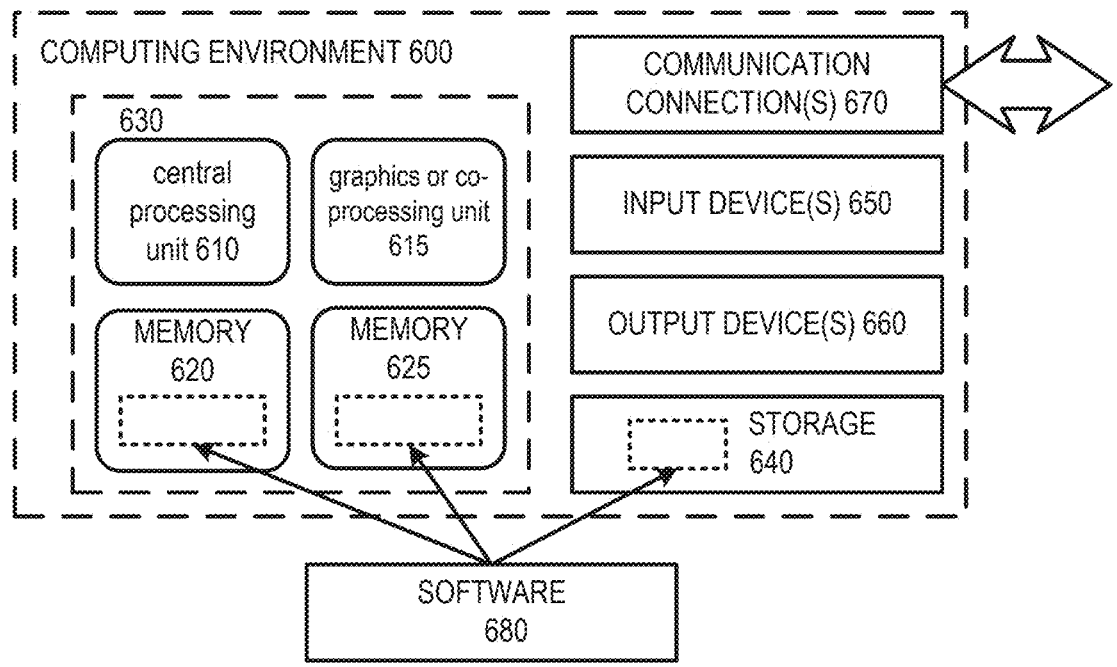
FIG. 6 is a schematic of an example computing system in which some described examples can be implemented.

FIG. 6 depicts a generalized example of a suitable computing system 600 in which the described innovations may be implemented. The computing system 600 is not intended to suggest any limitation as to scope of use or functionality of the present disclosure, as the innovations may be implemented in diverse general-purpose or special-purpose computing systems. In some examples, the computing system 600 may represent an example of and/or a component of the signal generation and analysis assembly 200, the signal analysis controller 250, and/or the automated valve controller 260

With reference to FIG. 6, the computing system 600 includes one or more processing units 610, 615 and memory 620, 625. In FIG. 6, this basic configuration 630 is included within a dashed line. The processing units 610, 615 execute computer-executable instructions, such as for implementing components of the computing environments of, or providing the data (e.g., 3D imaging data, CD data, simulation data, etc.) outputs shown in, FIGS. 1-8, described above. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s) 610, 615. The memory 620, 625 stores software 680 implementing one or more innovations described herein, in the form of computer-executable instructions suitable for execution by the processing unit(s) 610, 615.

A computing system 600 may have additional features. For example, the computing system 600 includes storage 640, one or more input devices 650 (e.g., the user input device 270), one or more output devices 660 (e.g., the display device 272 and/or the data recording device 274), and one or more communication connections 670 (e.g., the data transfer device 276). An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. The output device(s) 660 may be a display, printer, speaker, CD-writer, or another device that provides output from the computing system 600.

The communication connection(s) 670 enable communication over a communication medium to another computing entity, such as between direct CD and OCD systems. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

In general, the disclosed technology is described in the general context of computer-executable instructions, such as program modules, being executed by a dedicated processor, or other digital processing system or programmable logic device. Generally, program modules include routines, programs, objects, components, data structures, libraries, etc., that perform particular tasks or implement particular data types. Moreover, examples of the disclosed technology herein may be implemented with other computer system configurations, including hand-held devices, multiprocessor systems, microprocessor-based or programmable consumer electronics, network PCs, minicomputers, mainframe computers, dedicated processors, MCUs, PLCs, ASICs, FPGAs, CPLDs, systems on a chip, and the like. The disclosed technology may also be practiced in distributed computing environments where tasks are performed by remote processing devices that are linked through a communications network. In a distributed computing environment, program modules may be located in both local and remote memory storage devices.

GENERAL CONSIDERATIONS

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatuses are referred to as "lowest," "best," "minimum," or the like. It will be appreciated that such descriptions are intended to indicate that a selection among many used functional alternatives can be made, and such selections need not be better, smaller, or otherwise preferable to other selections.

Disclosed algorithms may be, for example, embodied as software or firmware instructions carried out by a digital computer. For instance, any of the disclosed fluid or solid solver techniques can be performed by a computer or other computing hardware (e.g., an ASIC or FPGA) that is part of a numerical simulation system. The numerical simulation system can be programmed or configured to perform numerical simulation computations (e.g., any of the numerical simulation techniques disclosed herein). The computer can be a computer system comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid state drives (e.g., Flash drives)). The one or more processors can execute computer-executable instructions stored on one or more of the tangible, non-transitory computer-readable media, and thereby perform any of the disclosed techniques. For instance, software for performing any of the disclosed embodiments can be stored on the one or more volatile, non-transitory computer-readable media as computer-executable instructions, which when executed by the one or more processors, cause the one or more processors to perform any of the disclosed numerical simulation techniques. The results of the computations can be stored (e.g., in a suitable data structure or lookup table) in the one or more tangible, non-transitory computer-readable storage media and/or can also be output to the user, for example, by displaying, on a display device, numerical simulation results, including 2D, 3D, time-evolved, etc., with a graphical user interface.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. A fermentation product monitoring system, comprising:
   an ultrasonic transmitter configured to be operatively coupled to a fluid conduit containing a volume of a fluid and to transmit a transmitted ultrasonic signal through the fluid at least partially along a primary ultrasonic signal path;
   an ultrasonic receiver configured to be operatively coupled to the fluid conduit and to receive a received ultrasonic signal that is based, at least in part, on the transmitted ultrasonic signal;
   an automated valve configured to regulate a flow of the fluid through the fluid conduit; and
   a signal generation and analysis assembly configured to generate and transmit a transmitted electrical signal to the ultrasonic transmitter and to receive a received electrical signal from the ultrasonic receiver; and
   wherein the signal generation and analysis assembly is configured to generate and transmit a valve actuation signal to actuate the automated valve to a closed position based, at least in part, on the received electrical signal representing a transition of the fluid from a first fluid that comprises a slurry to a second fluid that comprises a non-slurry.

2. The fermentation product monitoring system of claim 1, wherein the fluid conduit fluidly interconnects the automated valve and a fermentation vessel; wherein the first fluid comprises a yeast slurry; wherein the second fluid comprises a fermented liquid; and wherein the fermentation product monitoring system is configured to actuate the automated valve to regulate a flow of the fluid from the fermentation vessel through the fluid conduit and out of a fluid outlet downstream of the automated valve to cease the flow through the fluid conduit when the fluid within the primary ultrasonic signal path transitions from the yeast slurry to the fermented liquid.

3. The fermentation product monitoring system of claim 1, wherein the signal generation and analysis assembly is configured to measure an amplitude of the received electrical signal at a rate of 10-50 times per second; and wherein the signal generation and analysis assembly is configured to generate and transmit the valve actuation signal based, at least in part, on the amplitude of the received electrical signal.

4. The fermentation product monitoring system of claim 1, wherein the received ultrasonic signal represents an attenuated version of the transmitted ultrasonic signal; wherein the signal generation and analysis assembly is configured to determine an acoustic transmissivity of the fluid based, at least in part, on the received electrical signal; and wherein the signal generation and analysis assembly is configured to generate the valve actuation signal responsive to the acoustic transmissivity exceeding a threshold transmissivity.

5. The fermentation product monitoring system of claim 1, wherein the signal generation and analysis assembly comprises:
   an electrical signal generator configured to generate the transmitted electrical signal;
   a signal digitizer configured to receive an analog electrical signal that is based, at least in part, on the received electrical signal and to digitize the analog electrical signal into a digitized electrical signal;
   a signal analysis controller configured to receive an input electrical signal that is based, at least in part, on the digitized electrical signal and to calculate one or more fluid properties of the fluid based, at least in part, on the input electrical signal; and
   an automated valve controller that comprises a direct current (DC) power supply configured to generate and transmit the valve actuation signal to the automated valve.

6. The fermentation product monitoring system of claim 1, wherein the fermentation product monitoring system is configured such that no portion of the fermentation product monitoring system comes into direct contact with the fluid during operative use of the fermentation product monitoring system; and wherein each of the ultrasonic transmitter and the ultrasonic receiver is configured to be operatively coupled to a surface of the fluid conduit.

7. The fermentation product monitoring system of claim 1, wherein one or both of the ultrasonic transmitter and the ultrasonic receiver comprises an ultrasonic transducer that is configured to one or both of generate and receive an ultrasonic signal with a frequency that is at least 100 kilohertz (kHz) and at most 5 megahertz (MHz).

8. A method of using a fermentation product monitoring system, the method comprising:
   transmitting, with an ultrasonic transmitter of the fermentation product monitoring system, a transmitted ultrasonic signal through a fluid within a fluid conduit at least partially along a primary ultrasonic signal path, wherein the fluid conduit fluidly interconnects a fermentation vessel and a fluid outlet via an automated valve of the fermentation product monitoring system;
   receiving, with an ultrasonic receiver of the fermentation product monitoring system, a received ultrasonic signal that is based, at least in part, on the transmitted ultrasonic signal;
   processing, with a signal generation and analysis assembly of the fermentation product monitoring system, a received electrical signal that is based, at least in part, on the received ultrasonic signal; and
   actuating, with the signal generation and analysis assembly, the automated valve from an open state to a closed state to regulate a flow of fluid from the fermentation vessel through the fluid conduit and out of the fluid outlet;
   wherein the actuating the automated valve comprises generating, with the signal generation and analysis assembly, a valve actuation signal and transmitting the valve actuation signal to the automated valve; and
   wherein the generating the valve actuation signal is performed responsive to a change in the received electrical signal representing that the fluid within the primary ultrasonic signal path has transitioned from a first fluid that comprises a slurry to a second fluid that comprises a non-slurry.

9. The method of claim 8, wherein the first fluid comprises a yeast slurry; wherein the second fluid comprises a fermented liquid; and wherein the generating the valve actuation signal is performed to cease the flow through the fluid conduit when the fluid within the primary ultrasonic signal path transitions from the yeast slurry to the fermented liquid.

10. The method of claim 8, wherein the receiving the received ultrasonic signal comprises receiving an attenuated version of the transmitted ultrasonic signal; wherein the processing the received electrical signal comprises determining an acoustic transmissivity of the fluid based, at least in part, on a ratio of a received amplitude of the received ultrasonic signal to a transmitted amplitude of the transmitted ultrasonic signal; and wherein the generating the valve actuation signal is performed responsive to the acoustic transmissivity exceeding a threshold transmissivity.

11. The method of claim 8, wherein the transmitting the transmitted ultrasonic signal comprises transmitting one or more of a Gaussian waveform, a sinusoidal modulated Gaussian waveform, and a Gabor waveform.

12. The method of claim 8, wherein the signal generation and analysis assembly comprises a signal analysis controller, wherein the processing the received electrical signal comprises:
   receiving, with the signal analysis controller, an input electrical signal that is based, at least in part, on the received electrical signal; and
   calculating, with the signal analysis controller and based at least in part on the input electrical signal, one or more fluid properties of the fluid;
   wherein the calculating the one or more fluid properties comprises preprocessing, with the signal analysis controller, a modified signal that is based, at least in part, on the input electrical signal; and wherein the preprocessing the modified signal comprises:
   subtracting a mean value from one or both of the input electrical signal and the modified signal; and
   gating one or both of the input electrical signal and the modified signal based on an expected time of flight of the transmitted ultrasonic signal through the fluid to isolate a portion of one or both of the input electrical signal and the modified signal that corresponds to a portion of the received ultrasonic signal that represents propagation of the transmitted ultrasonic signal along the primary ultrasonic signal path.

13. The method of claim 8, wherein the method is performed while every portion of the fermentation product monitoring system is fluidly isolated from the fluid.

14. The method of claim 8, further comprising, prior to the transmitting the transmitted ultrasonic signal, operatively coupling each of the ultrasonic transmitter and the ultrasonic receiver to an external surface of the fluid conduit.

15. A fermentation product monitoring system, comprising:
   an ultrasonic transmitter configured to be operatively coupled to a vessel containing a volume of a fluid and to transmit a transmitted ultrasonic signal through the fluid at least partially along a primary ultrasonic signal path;

an ultrasonic receiver configured to be operatively coupled to the vessel and to receive a received ultrasonic signal that is based, at least in part, on the transmitted ultrasonic signal; and a signal generation and analysis assembly configured to generate and transmit a transmitted electrical signal to the ultrasonic transmitter and to receive a received electrical signal from the ultrasonic receiver, wherein the signal generation and analysis assembly is configured to determine one or more fluid properties of the fluid based, at least in part, on the received electrical signal, wherein the transmitted ultrasonic signal comprises one or more of a Gaussian waveform, a sinusoidal modulated Gaussian waveform, or a Gabor waveform, and wherein the signal generation and analysis assembly is configured to analyze the received electrical signal via a Gaussian reconstruction scheme to determine the one or more fluid properties.

16. The fermentation product monitoring system of claim 15, wherein the fermentation product monitoring system is configured such that the ultrasonic transmitter and the ultrasonic receiver are operatively coupled to a surface of the vessel on opposing sides of the vessel during operative use of the fermentation product monitoring system.

17. The fermentation product monitoring system of claim 15, wherein the signal generation and analysis assembly is configured to generate a fluid monitoring report that represents the one or more fluid properties; and wherein the fluid monitoring report comprises an indication of one or more of a density of the fluid, an indication of a specific gravity of the fluid, an indication of a rate of change of one or more fluid properties of the fluid, an indication that a fermentation process has concluded, an estimate as to when the fermentation process will conclude, and a confidence interval associated with any other indication provided in the fluid monitoring report.

18. The fermentation product monitoring system of claim 15, wherein the signal generation and analysis assembly comprises one or more of:

a user input device configured to receive an input from a human user to direct operation of the fermentation product monitoring system;

a display device configured to provide a visual representation of a fluid monitoring report that represents the one or more fluid properties;

a data recording device configured to record at least a portion of the fluid monitoring report onto a non-transitory storage medium; and a data transfer device configured to convey at least a portion of the fluid monitoring report to an external device.

19. The fermentation product monitoring system of claim 15, wherein every portion of the fermentation product monitoring system is fluidly isolated from the fluid.

* * * * *